US012795063B2

(12) United States Patent
Liu et al.

(10) Patent No.: US 12,795,063 B2
(45) Date of Patent: Nov. 10, 2026

(54) MULTIPLE-VIEWS-ONE-EYE DISPLAY METHOD WITH SUB-PIXELS AS BASIC DISPLAY UNITS

(71) Applicant: Sun Yat-sen University, Guangdong (CN)

(72) Inventors: Lilin Liu, Guangdong (CN); Dongdong Teng, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 801 days.

(21) Appl. No.: 18/580,381

(22) PCT Filed: May 22, 2020

(86) PCT No.: PCT/CN2020/091877
§ 371 (c)(1),
(2) Date: Jan. 18, 2024

(87) PCT Pub. No.: WO2021/196370
PCT Pub. Date: Oct. 7, 2021

(65) Prior Publication Data

US 2024/0223744 A1 Jul. 4, 2024

(30) Foreign Application Priority Data

Apr. 3, 2020 (CN) ......................... 202010258846.0

(51) Int. Cl.
*H04N 13/398* (2018.01)
*G09G 3/00* (2006.01)
(Continued)

(52) U.S. Cl.
CPC ........... *H04N 13/398* (2018.05); *G09G 3/001* (2013.01); *H04N 13/156* (2018.05); *H04N 13/32* (2018.05);
(Continued)

(58) Field of Classification Search
CPC .... H04N 13/398; H04N 13/32; H04N 13/383; H04N 13/156; G09G 3/001
(Continued)

(56) References Cited

U.S. PATENT DOCUMENTS 8,724,039 B2 * 5/2014 Huang .................. G09G 3/003 349/15
9,654,766 B2 * 5/2017 Kim ...................... H04N 13/32
(Continued)

FOREIGN PATENT DOCUMENTS

CN 101784941 7/2010
CN 104681001 6/2015
(Continued)

OTHER PUBLICATIONS

"Office Action of China Counterpart Application", issued on Feb. 8, 2022, p. 1-p. 9.

*Primary Examiner* — Matthew David Kim
(74) *Attorney, Agent, or Firm* — JCIPRNET

(57) ABSTRACT

A multiple-views-one-eye display method with sub-pixels as basic display units. The sub-pixels of a display device are taken as basic display units. Through beam-splitting modulation of a grating device, lights from different sub-pixel groups are respectively guided to different viewing zones where a viewer's pupil(s) is located. Different sub-pixel groups project different perspective views of a target scene. Thus with more than one perspective views being received by a same pupil of a viewer, monocular focusable 3D scene display gets implemented. During the display, light beams from sub-pixels of different colors intersect at each display point and overlap to be a colorful spatial light-spot. The light from different colored sub pixels propagates along their respective directions and overlap on each display object point to form spatial colored light points.

9 Claims, 15 Drawing Sheets

(51) Int. Cl.
*H04N 13/156* (2018.01)
*H04N 13/32* (2018.01)
*H04N 13/383* (2018.01)

(52) U.S. Cl.
CPC ... *H04N 13/383* (2018.05); *G09G 2300/0439* (2013.01)

(58) Field of Classification Search
USPC ........................................................... 348/42
See application file for complete search history.

(56) References Cited

U.S. PATENT DOCUMENTS

| | | | | |
|---|---|---|---|---|
| 2013/0127840 | A1* | 5/2013 | Tsuzaki | H04N 13/111 345/419 |
| 2015/0248210 | A1* | 9/2015 | Lee | G06F 1/3265 345/593 |
| 2015/0331291 | A1* | 11/2015 | Sakaigawa | G02F 1/136286 349/144 |
| 2016/0247425 | A1* | 8/2016 | Jung | H04N 13/341 |
| 2017/0150131 | A1* | 5/2017 | Van Putten | H04N 13/305 |
| 2017/0195657 | A1* | 7/2017 | Li | H04N 13/351 |
| 2017/0212359 | A1* | 7/2017 | Kim | G03H 1/2294 |
| 2017/0272739 | A1* | 9/2017 | Kroon | H04N 13/315 |
| 2018/0081239 | A1* | 3/2018 | Zhao | G02F 1/136 |
| 2018/0374435 | A1* | 12/2018 | Chen | G09G 3/3607 |
| 2019/0004324 | A1* | 1/2019 | Wang | G02F 1/133602 |
| 2020/0012128 | A1* | 1/2020 | Chen | G02B 30/27 |
| 2020/0129135 | A1* | 4/2020 | Nebosis | A61B 6/4035 |
| 2020/0342797 | A1* | 10/2020 | Zhai | G02F 1/29 |
| 2020/0371378 | A1* | 11/2020 | Makinen | H04N 13/365 |

FOREIGN PATENT DOCUMENTS

| | | | |
|---|---|---|---|
| CN | 104950458 | A | 9/2015 |
| CN | 105807438 | A | 7/2016 |
| CN | 106291958 | | 1/2017 |
| CN | 106324847 | | 1/2017 |
| CN | 106873170 | | 6/2017 |
| CN | 106997101 | | 8/2017 |
| CN | 107147895 | A | 9/2017 |
| CN | 109782453 | A | 5/2019 |
| CN | 110035274 | A | 7/2019 |
| CN | 110401829 | | 11/2019 |
| CN | 110632767 | A | 12/2019 |
| JP | 2019-078852 | A | 5/2019 |
| KR | 20140025784 | | 3/2014 |
| WO | WO-2019/137272 | A1 | 7/2019 |

* cited by examiner

MULTIPLE-VIEWS-ONE-EYE DISPLAY METHOD WITH SUB-PIXELS AS BASIC DISPLAY UNITS

CROSS-REFERENCE TO RELATED APPLICATION

This application is a 371 application of International PCT application serial no. PCT/CN2020/091877 filed on May 22, 2020, which claims the priority benefit of China application no. 202010258846.0, filed on Apr. 3, 2020. The entirety of each of the above mentioned patent applications is hereby incorporated by reference herein and made a part of this specification.

TECHNICAL FIELD

The present invention relates to the technical field of three-dimensional (3D) display, and more particularly to a multiple-views-one-eye display method with sub-pixels as basic display units.

BACKGROUND

Rather than traditional two-dimensional (2D) displays, three-dimensional displays can provide light information of the spatial dimensions same to the real world, and are receiving more and more attentions. Stereoscopic display (including autostereoscopic display), which is based on binocular parallax, projects a corresponding two-dimensional image to each eye of a viewer, and triggers the depth perception of a viewer by the intersection of two eyes' visual directions at the scene out of a screen. In this process, to see corresponding two-dimensional view clearly, each eye of the viewer has to keep focusing on the display panel, resulting in a vergence-accommodation conflict (VAC) problem. The VAC problem refers to a mismatching between the binocular converging distance and the monocular accommodation distance. When see a real 3D scene, the binocular converging distance and the monocular accommodation distance of a viewer is consistent. Such mismatching between the binocular converging distance and the monocular accommodation distance is in conflict with the human's physiologic habit, and is a main cause of visual discomfort. It is taken as a bottleneck problem haunting present 3D display industry. Multiple-views-one-eye display is an effective technological path for overcoming the VAC problem. In a multiple-views-one-eye display, through the guidance of an optical device, at least two two-dimensional images of a scene to be displayed are guided into each pupil of a viewer, from different pixel groups. Thus, for a displayed spatial point, at least two passing-through light beam from different pixels will be received by each pupil. When the light intensity of a light spot formed by superimposition of two light beam at a displayed point can drag the eye' focus to this displayed point, the VAC problem will get solved.

SUMMARY

The present invention proposes a multiple-views-one-eye display method, with sub-pixels as the basic display units. Through light splitting of a grating device, multiple images of a scene to be displayed are projected by multiple sub-pixel groups and are guided into the region where a viewer's pupil(s) is (are) located, to implement monocular focusable 3D scene display based on multiple-views-one-eye principle. Existing multiple-views-one-eye displays based on beam-splitting grating take pixels as basic display units, and guide multiple perspective views from different pixel groups to the region where a viewer's pupil(s) is (are) located, such as what disclosed in PCT/CN2019/070029 (GRATING BASED THREE-DIMENSIONAL DISPLAY METHOD FOR PRESENTING MORE THAN ONE VIEWS TO EACH PUPIL).

Differently, the method disclosed in present patent application takes sub-pixels as basic display units, wherein different sub-pixel groups are designed for projecting multiple perspective views to the region where a viewer's pupil(s) is (are) located. Comparing with needing at least two pixels in an existing multiple-views-one-eye display method, forming a monocular focusable spatial light spot only needs at least two sub-pixels in this patent application. By comparison, multiple-views-one-eye display method in this patent application using sub-pixels as display units can effectively improve capability of the display device to project more two-dimensional views, which is more conducive to enlarging the eye-box for the observer's eyes, or expands the display depth of the monocular focusable display scene by improving the spatial density of the viewing zones. Furthermore, in this patent application, a projection device is used to project an enlarged image of the display device, extending the scope of application of the method to near-eye display; and a relay device is used to optimize the form factor of the optical structure. The proposed method can be directly applied to a binocular 3D display optical engine, or can also be applied to a monocular optical engine.

In order to realize monocular focusable three-dimensional display based on multiple-views-one-eye while using sub-pixels as display units, the present invention provides the following solutions:

a multiple-views-one-eye display method with sub-pixels as basic display units, characterized by comprising the following steps:

(i) with each sub-pixel of a display device as a basic display unit, arranging a grating device in front of the display device along transmission direction of light emitting from each sub-pixel of a display device, to guide light from each sub-pixel to corresponding viewing zone respectively;

wherein, sub-pixels corresponding to a same viewing zone constitute a sub-pixel group, and different sub-pixel groups do not share a same sub-pixel at a same time-point;

(ii) loading a corresponding image to each sub-pixel group by a control device connected with the display device, wherein image information loaded to each sub-pixel is a projected light information of a scene to be displayed, along a transmission direction of a light projected by the sub-pixel and entering into an region where a pupil of an viewer is located;

wherein, the image displayed by one sub-pixel group is one perspective view of the scene to be displayed, and the image displayed by a spliced sub-pixel group spliced by different complementary parts from different sub-pixel groups is a spliced view;

wherein, the spatial position distribution of viewing zones corresponding to sub-pixel groups of the display device is arranged such that light information of at least two perspective views, or at least one perspective view and one spliced view, or at least two spliced views are received by a same pupil of the viewer.

Furthermore, a grating unit of the grating device is a cylindrical lens, or a slit.

Furthermore, the grating device is composed of microstructure units, with each microstructure unit of the grating device being placed correspondingly to each sub-pixel of the display device in a one-to-one manner for modulating the light from a corresponding sub-pixel.

Furthermore, step (i) further comprises forming, by grating units spaced by (T−1) grating unit(s), a grating-unit group along an arranging direction of the grating units; and in step (ii) further comprises controlling, by the control device, T grating-unit groups at T adjacent time-points of a time-period sequentially to be allowable for light transmission, with only one grating-unit group being turned on for light transmission at one time-point; wherein 7≥2.

Furthermore, step (i) further comprises, respectively emitting light of M kinds of colors by sub-pixels of the display device, and forming, by grating units spaced by (M−1) grating unit(s), a grating-unit group along the arranging direction of the grating units, wherein M≥2;

wherein, the M grating-unit groups are arranged to be correspond to the M colors by a one-to-one manner, with each grating-unit group of the M grating-unit groups only allowing light of a corresponding color passing through.

Furthermore, step (i) further comprises placing a projection device at a position corresponding to the display device, for projecting an enlarged image of the display device.

Furthermore, step (i) further comprises placing a relay device into a transmission path of light projected by the display device, for guiding light from the display device to the region where a viewer's pupil is located.

Furthermore, the relay device is a reflective surface, or a semi-transparent and semi-reflective surface, or a combination of free-form surfaces, or an optical waveguide device.

Furthermore, step (ii) further comprises connecting a tracking device with the control device, and tracking a position of a viewer's pupils real-timely.

Furthermore, step (ii) further comprises, determining, according to the position of the viewer's pupil, the image information loaded to each sub-pixel projecting light into the viewer's pupil to be a projected light information of a scene to be displayed along a transmission direction of a light projected by sub-pixel and entering into a pupil of a viewer.

Compared with the multiple-views-one-eye display using pixels as the display unit, the present invention in which sub-pixels is taken as the basic display unit can effectively increase the number of the projected two-dimensional perspective views, and combined with the characteristic design of the grating device, requirements of the multiple-views-one-eye display on the number of projected 2D perspective view is satisfied. The present invention has the following technical effects: sub-pixels are taken as the basic display units in a multiple-views-one-eye display in the present invention, providing a method for implement VAC-free 3D display. The multiple-views-one-eye display method with sub-pixels as basic display units in the present invention can effectively improve capability of the display device to project more two-dimensional views, which is more conducive to enlarging the eye-box for the observer's eyes, or extends the display depth of the monocular focusable display scene by improving the spatial density of the viewing zones. Furthermore, in the present invention, a projection device is used to project an enlarged image of the display device, extending the range of application of the method to near-eye display; and a relay device is used to optimize the spatial form factor of the optical structure. The proposed method can be directly applied to a binocular 3D display optical engine, or be applied to a monocular optical engine.

The details of the embodiments of the present invention are embodied in the drawings or the following descriptions. Other features, objects, and advantages of the present invention will become more apparent from the following descriptions and drawings.

BRIEF DESCRIPTION OF THE DRAWINGS

The drawings are used to help better understand the present invention and are also part of the description. The drawings and descriptions illustrating the embodiments together serve to explain the principles of the present invention.

DETAILED DESCRIPTION

The multiple-views-one-eye display method of the present invention takes sub-pixels as display units. The sub-pixels are taken as display unit directly and several sub-pixel groups are used to project multiple perspective views to a viewer's pupil. For a displayed point, different directional light beams from different perspective views overlap to form a monocular focusable displayed light spot, thus implementing a VAC-free 3D display.

Figure 1:
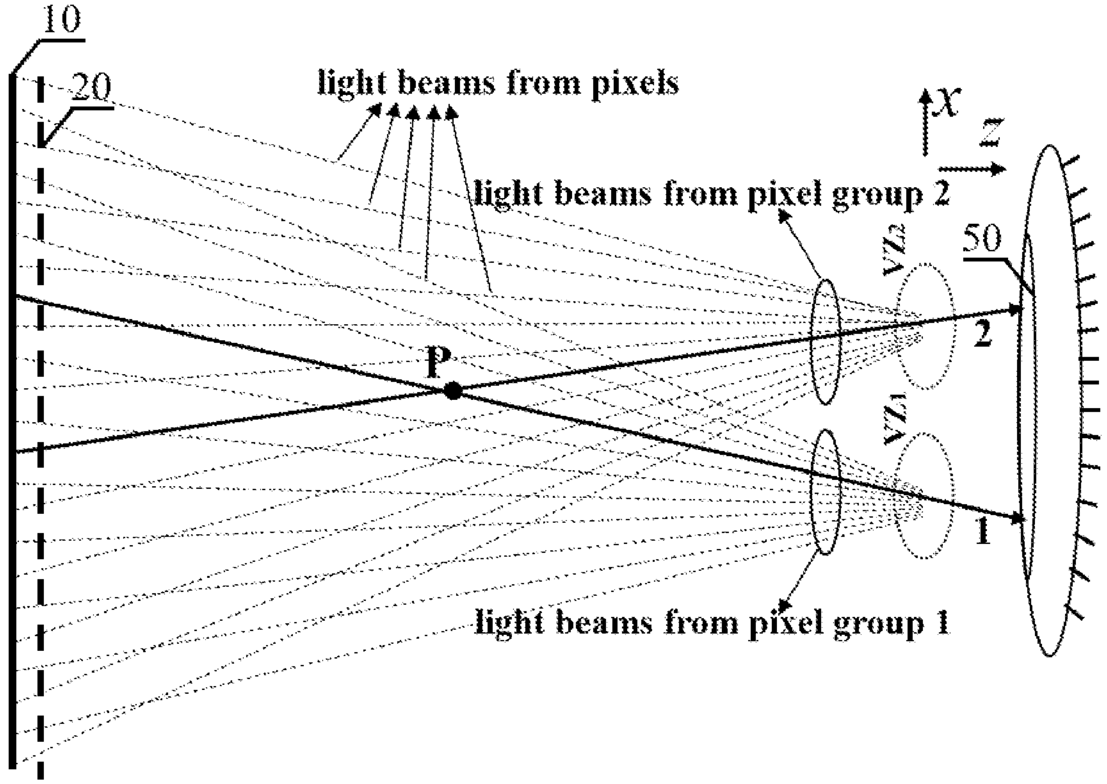
FIG. 1 shows a schematic view of an existing multiple-views-one-eye display with pixels as display units.

The existing multiple-views-one-eye technology takes pixels as basic units, and projects at least two perspective views to the viewer by different pixel groups of the displaying device 10. For any displayed point, light beams passing through the displayed point from at least two pixel groups are overlapped to form a spatial displayed light spot that is monocular focusable to viewer. When the overlapped spatial light spot has more attraction to the viewer's eyes compared with the light intensity of each overlapped light beam at the emitting pixel, the viewer's eyes can be drawn to focus on the spatial overlapped light spot, thereby overcoming the focus-convergence conflict. Concretely, FIG. 1 shows an example, with two perspective views being received by a pupil. Pixel group 1, displays perspective view 1 converging to viewing zone $VZ_1$. Being guided by a grating device 20, the lights from the pixel group 1 pass through the viewing zone $VZ_1$, and miss the viewing zone $VZ_2$. Pixel group 2, displays a perspective view 2 converging to a viewing zone $VZ_2$. Being guided by a grating device 20, the lights from the pixel group 2 pass through the viewing zone $VZ_2$, and miss the viewing zone $VZ_1$. The light from the pixel group 1 with the light information of perspective view 1 and the light from the pixel group 2 with the light information of perspective view 2 through the viewing zone $VZ_2$ enters the viewer's pupil 50 through the viewing zone $VZ_1$ and the viewing zone $VZ_2$ respectively. The viewing zones are arranged along the x direction. At a point P to be displayed, a light beam 1 from the pixel group 1 and a light beam 2 from the pixel group 2 are overlapped to form a spatial overlapped light spot. When the light intensity distribution of the spatial overlapped light spot can drag the focus of the viewer's eye to point P, the focus of the viewer's eye will no longer be forcibly fastened to the pixel which emits the light beam 1 or the light beam 2. That is to say, the focus of the viewer's eye will no longer be forcibly fastened to the display device 10, thereby overcoming the focus-convergence conflict. This applies to all the monocular focusable displayed points, which together construct a monocular focusable displayed scene.

In fact, by increasing the number and distribution density of the viewing zones, light information of more perspective views can be received by the viewer's pupil 50. In this way, more overlapped light beams passing through each displayed point will enter into the viewer's pupil 50 along their respective directions. The overlap of a larger number of the overlapped light beams can improve the ability of the spatial superimposed light points to attract the focus of the viewer's eyes, which is beneficial to the display of scenes with a larger distance from the screen. At the same time, more viewing zones may also bring a wider eye-box for the viewer's pupil 50. For an viewer's pupil 50 moving across such a wider eye-box, a VAC-free display keeps visible based on the multiple-views-one-eye principle. In a multiple-views-one-eye display based on a grating device 20, the increase in the number of viewing zones corresponds to the increase in the number of perspective views projected, and the pixels of a display device 10 should be divided into more pixel groups by grating device 20, for projecting more perspective views. As a result, an amount of pixels in each pixel group will be decreased, which means a decrease in resolution of perspective views projected.

Figure 2:
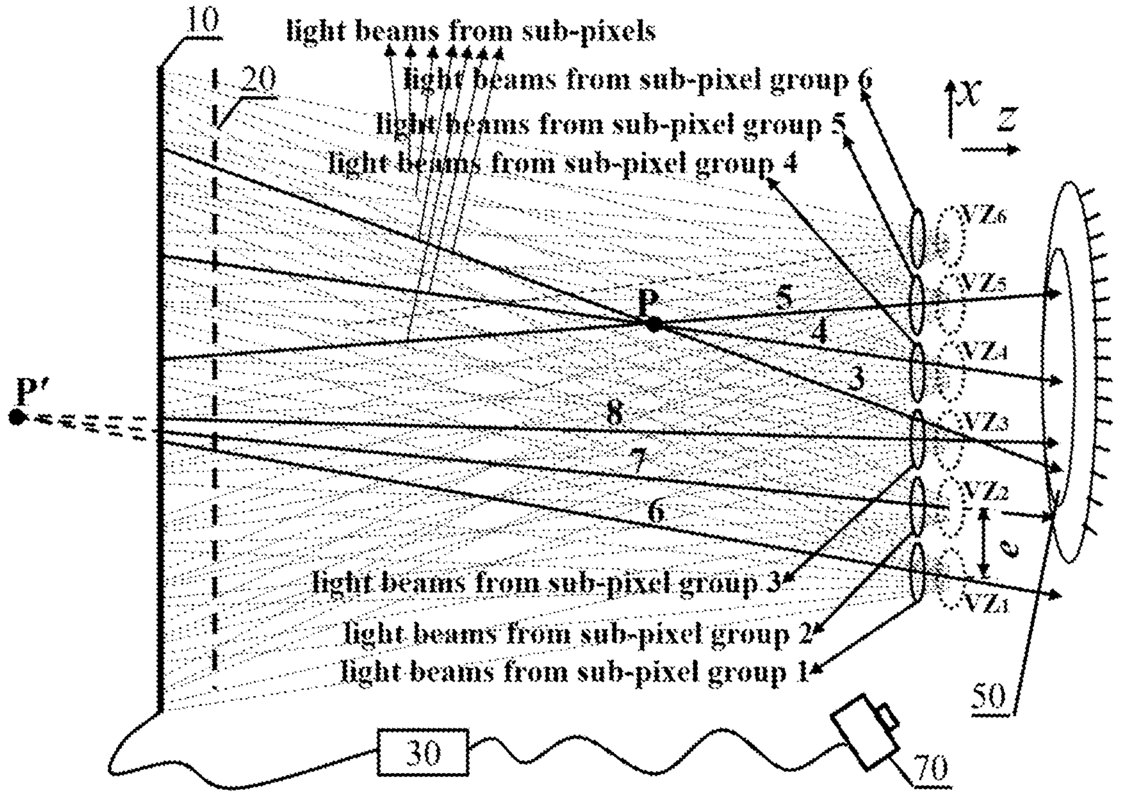
FIG. 2 shows a schematic view of a multiple-views-one-eye display with sub-pixels as basic display units in present application.

In the present patent application, a multiple-views-one-eye display is implemented by taking sub-pixels as the basic display units. Relative to a multiple-views-one-eye display which takes pixels as the basic display units, the number of projected perspective views and corresponding viewing zones get increased by N−1 times, when a same display device 10 and a same grating device 20 is employed. Here, N is the sub-pixel number of a pixel, and $N \geq 2$. M denotes the number of colors of the light from a display device 10. For example, a pixel of the display device 10 shown in FIG. 2 includes three type of sub-pixels, namely R(red), G(green), and B(blue) sub-pixels, which emit light of M=3 colors (i.e., R(red), G(green), and B(blue)), respectively. Six viewing zones, $VZ_1$, $VZ_2$, $VZ_3$, $VZ_4$, $VZ_5$, and $VZ_6$, get generated by light splitting of a grating device 20. Obviously, the sub-pixel number corresponding to each of the 6 viewing zones equals to the pixel number of the pixel group corresponding to each of the 2 viewing zones in FIG. 1. According to the display principle of a multiple-views-one-eye display, in FIG. 1, a pupil needs to receive information of all the 2 perspective views through 2 corresponding viewing zones. In FIG. 2, a pupil only needs to receive information of 2 of the 6 perspective views through 2 corresponding viewing zones. In comparison, the 6 viewing zones in FIG. 2 can provide a larger eye-box for a viewer's pupil 50. Or, by increasing the distribution density of viewing zones in FIG. 2, more perspective views can be guided into a viewer's pupil, so as to improve the attraction of light spots formed by overlapping to a viewer's focus, resulting in a better multiple-views-one-eye display effect. That is to say, relative to conventional multiple-views-one-eye display with pixels as display units, the multiple-views-one-eye display method taking sub-pixels as basic display units in the present patent application can effectively increase the number of projected perspective views and that of the corresponding viewing zones, without sacrificing the resolution of projected perspective views or the display frequency. More viewing zones can provide a larger eye-box, or optimize the multiple-views-one-eye display effects by increasing the distribution density of viewing zones.

The sub-pixels corresponding to a same viewing zone make up a sub-pixel group. The six viewing zones $VZ_1$, $VZ_2$, $VZ_3$, $VZ_4$, $VZ_5$ and $VZ_6$ of FIG. 2 correspond to six sub-pixel groups, i.e. sub-pixel group 1, sub-pixel group 2, sub-pixel group 3, sub-pixel group 4, sub-pixel group 5, and sub-pixel group 6, respectively. Image information loaded to each sub-pixel is controlled, by control device 30, to be a projected light information of a scene to be displayed, along a transmission direction of a light projected by sub-pixel and entering into an region where a pupil 50 of an viewer is located. That is to say, each sub-pixel group projects a perspective view converging to corresponding viewing zone. Each viewing-zone interval is designed such that light information of at least two perspective views can be received by a pupil 50. A displayed point P is exampled in FIG. 2. Passing through this point P, three light beams 3, 4, and 5, which respectively come from sub-pixel group 3, sub-pixel group 4, and sub-pixel group 5, are overlapped to form a displayed light spot that is monocular focusable. The displayed light spot locates between the display device 10 and the pupil 50, which is an overlapping point of real light beams from different sub-pixels. Here, straight lines in FIG. 2 indicate the light beams projected by each sub-pixel to the region where the viewer's pupil 50 is located, such as the light beams 3, 4, and 5. Actually, the light beam emitted by each sub-pixel is a divergent beam with a divergence angle. One function of a grating device 20 lies in constraining the divergence angle of a light beam from corresponding sub-pixels. Such that, on the plane where the viewer's pupil 50 is located, along the direction in which the grating units are arranged, for a light beam from each sub-pixel, light distribution region with light intensity larger than 50% of the maximum light intensity having a size smaller than the pupil's diameter. Under this condition, the overlapping light intensity of more than one passing-through light beams at a displayed point will have more powerful attraction to the focus of the viewer's eye. Thus, even with overlapping of at least two passing-through light beams, a monocular focusable displayed light spot may get displayed in a certain depth range based on multiple-views-one-eye display. In present patent application, the light beam coming from a sub-pixel and reaching to a region where a pupil 50 is located is drawn as a light ray, when its divergence angle meets the above requirement. In the −z region, overlapped spatial light spots can also get displayed, such as point P' shown in FIG. 2. The reverse extension lines of light beams 6, 7, and 8 intersect at this point P'. According to the diffraction transmission theory, equivalent light distribution of light beams 6, 7, and 8 along their transmission directions' reverse directions may be determined. For a viewer's eye receiving these light beams 6, 7, and 8, an overlapping of corresponding equivalent light distribution at point P' is seen. Same to the displayed point P, the displayed point P' is also taken as an overlapped spatial light spot at point P', wherein image of displayed point P' forms a real image point at the retina of a viewer's eye. In present patent application, to a viewer, displayed scenes on either side of a display device 10 both are generated by overlapping of more than one passing-through light beams. In following sections, only displayed scenes at the side where emitted light from display device 10 transmits are exampled.

Figure 3:
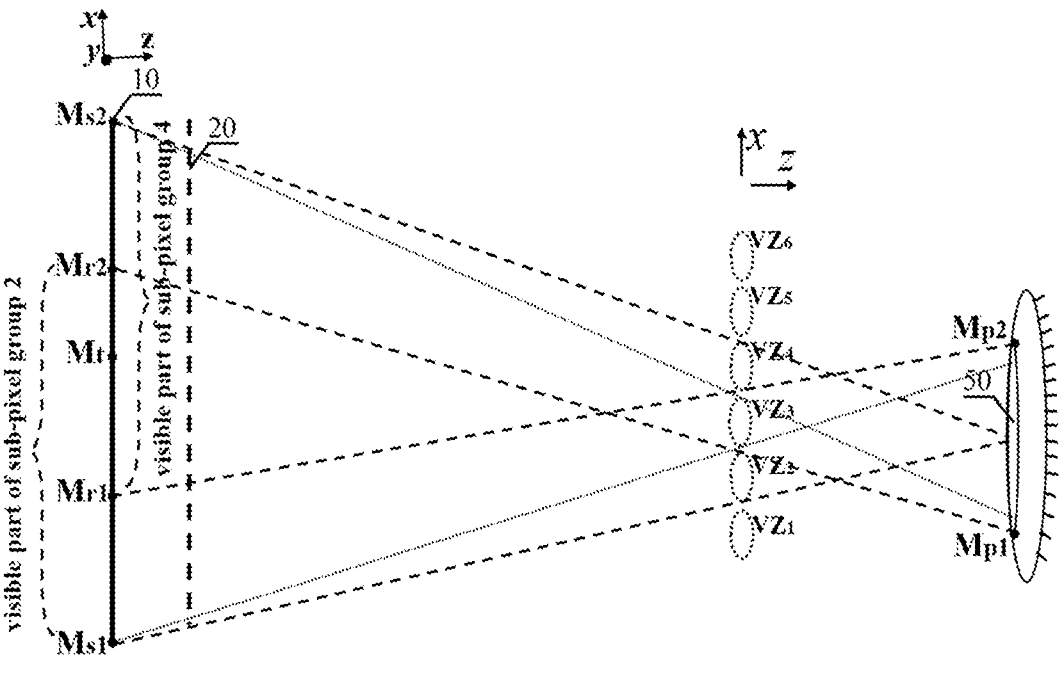
FIG. 3 is an explanatory diagram showing the splicing rule of a spliced sub-pixel group.

In FIG. 2, a viewer's pupil 50 is placed close to the plane of the viewing zones. When the viewer's pupil 50 deviates from the plane of the viewing zones forward or backward, it may not be able to receive all light beams of at least two complete perspective views. For example, the viewer's pupil 50 shown in FIG. 3, can receive information of a complete perspective view passing through the viewing zone 3, which is projected by corresponding sub-pixel group 3. But, only partial perspective view on a region $M_{s2}M_{r1}$ projected by sub-pixel group 4 through the viewing zone 4 and only partial perspective view on a region $M_{s1}M_{r2}$ projected by sub-pixel group 2 through viewing zone 2 are received by the viewer's pupil 50 shown in FIG. 3. Here, along the x-direction (i.e. the direction in which the viewing zones are arranged), points $M_{p1}$ and $M_{p2}$ are two edge points of the viewer's pupil 50, points $M_{s1}$ and $M_{s2}$ are edge points of the sub-pixel distribution region of the display device 10. Point $M_{r1}$ is the intersection point of the display device 10 with a line connecting point $M_{p2}$ and an edge point (in −x direction) of the viewing zone $VZ_4$. Point $M_{r2}$ is the intersection point of the display device 10 with a line connecting point $M_{p1}$ and an edge point (in x direction) of the viewing zone $VZ_2$. The $M_{s2}M_{r1}$ region and the $M_{s1}M_{r2}$ region overlap with each other. Thus, a spliced sub-pixel group gets formed by splicing the sub-pixels from $M_{s2}M_t$ region of the sub-pixel group 4 and sub-pixels from $M_{s1}M_t$ region of the sub-pixel group 2. The $M_{s2}M_t$ region and the $M_{s1}M_t$ region are spatially complementary with each other. The image displayed by the spliced sub-pixel group is a spliced view of the scene to be displayed. A point $M_t$ exists in this overlapping region $M_{r1}M_{r2}$. Thus, the viewer's pupil 50 shown in FIG. 3 will receive a complete perspective view and a complete spliced view. For a displayed point, two passing-through light beams, from the perspective view and the spliced view respectively, are received by the viewer's pupil 50 and overlap into a displayed point which is monocularly focusable in a certain depth range. By analogy, as the distance between the viewer's pupil 50 and the surface of the viewing zone increases, the spliced sub-pixel group that can be observed will be the spliced by different parts of more sub-pixel groups that are complementary to each other.

Figure 4:
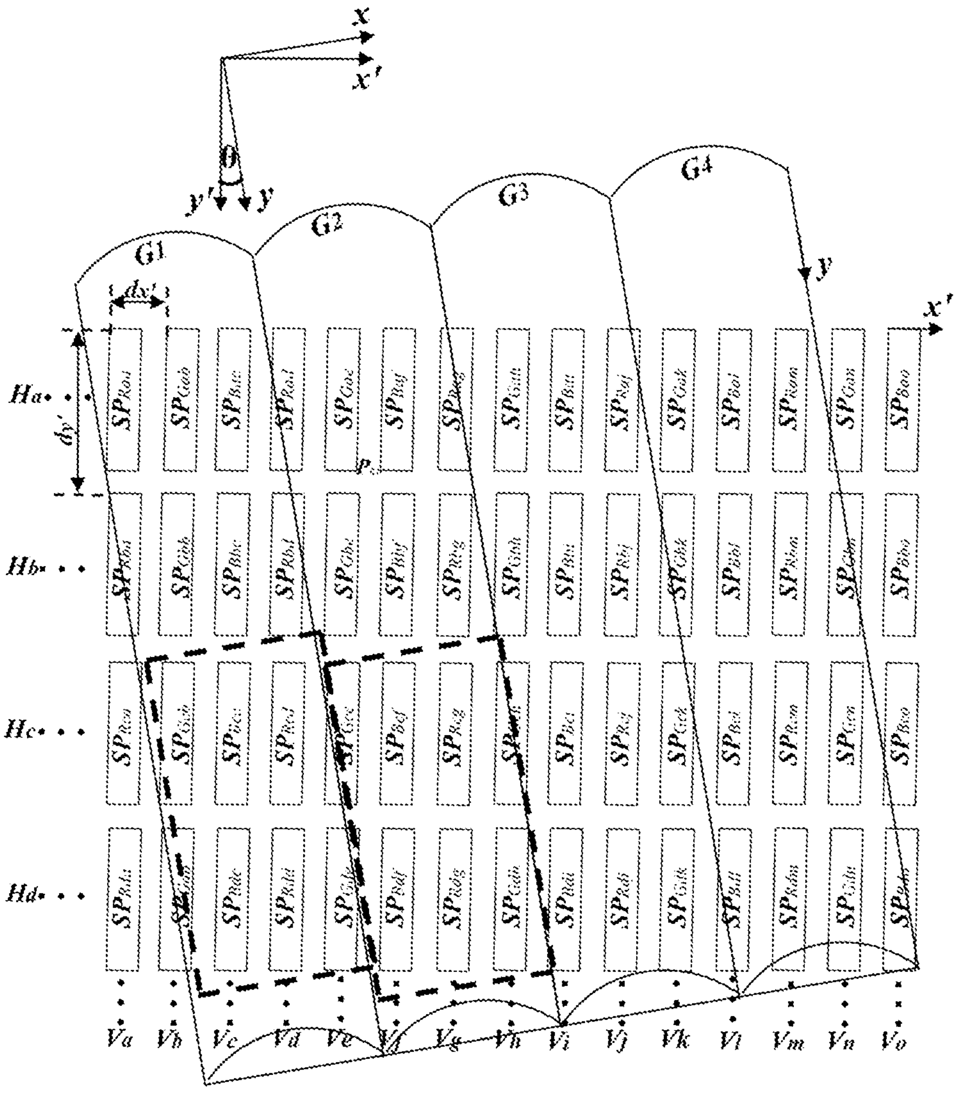
FIG. 4 is a schematic view shows the position relationship between a grating device and corresponding sub-pixels.
Figure 5:
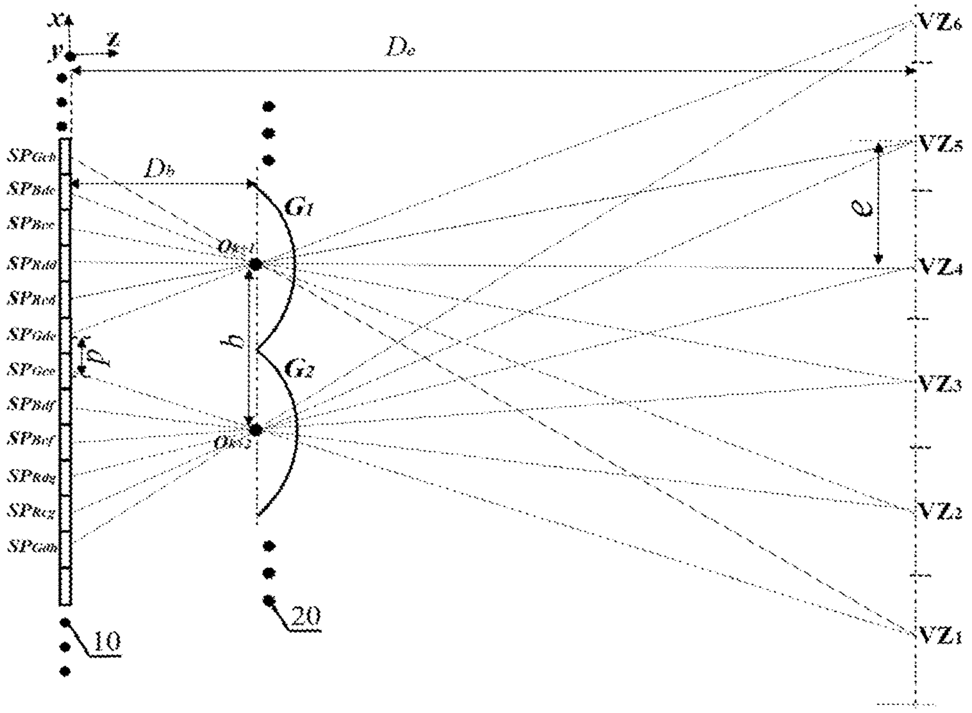
FIG. 5 is a schematic view shows the light splitting principle of a cylindrical-lens-array grating device.
Figure 6:
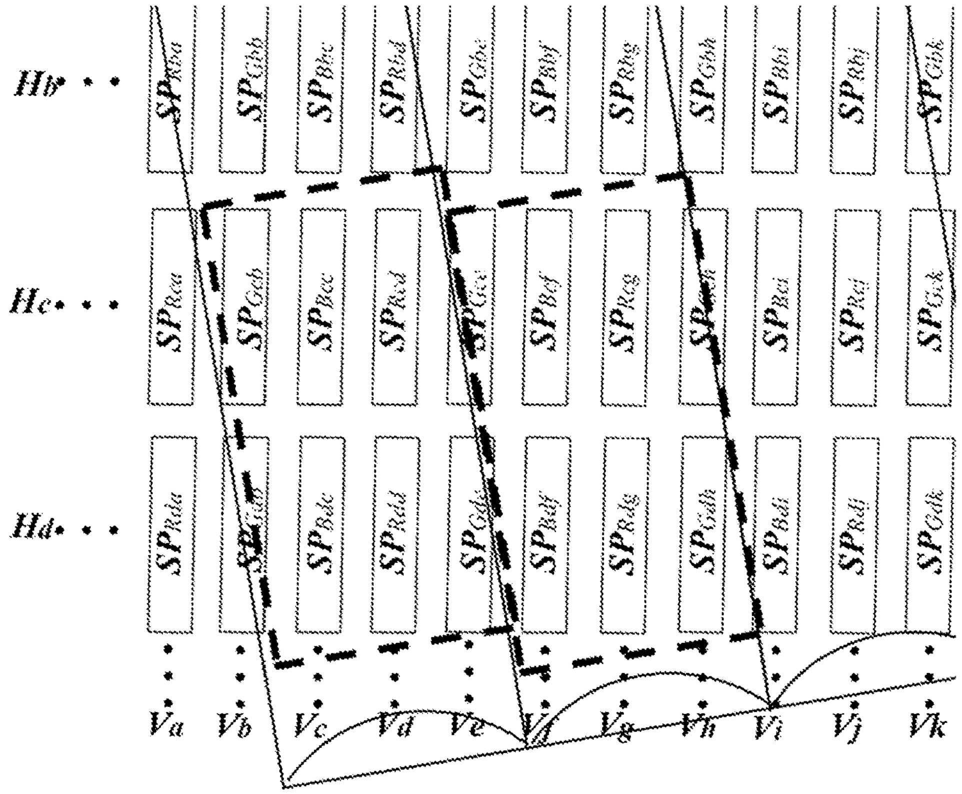
FIG. 6 is a partial enlarged view shows the position between a grating device and corresponding sub-pixels shown in FIG. 4.

Specifically, a cylindrical lens array is exampled as a grating device 20, and a conventional display panel with arrangement of RGB sub-pixels is employed as a display device 10, as shown in FIG. 4. Concretely, each pixel is formed by three sub-pixels emitting R light, G light and B light respectively, which are aligned along x'-direction. Along y'-direction, adjacent sub-pixels are of a same color and arranged to a column. The grating device 20 takes cylindrical lenses arranged along x-direction as grating units, and are placed correspondingly to display device 10. According to the following beam-splitting formula:

$$p/e = D_b/(D_e - D_b), \quad \text{(Eq. 1)}$$

$$b/(N_{zone} \times p) = (D_e - D_b)/D_e, \quad \text{(Eq. 2)}$$

light beams from adjacent $N_{zone}$=6 sub-pixels arranged in a misaligned manner are guided by a corresponding grating unit to the corresponding $N_{zone}$=6 viewing zones arranged along the x-direction. These adjacent $N_{zone}$=6 sub-pixels constitute a sub-pixel periodic unit. In FIG. 4, two such sub-pixel periodic units are shown, marked by two dotted boxes. The principle of splitting and guiding the light emitting from each sub-pixel by a grating device 20 is shown in FIG. 5. These two sub-pixel period units correspond to the grating units $G_1$ and $G_2$ respectively. Points $O_{k+1}$ and $O_{k+2}$ are the optical centers of the grating units (cylindrical lenses) $G_1$ and $G_2$ on the x-z plane. In Eqs. 1 and 2, p is the spacing between sub-pixels of a sub-pixel periodic unit along the x-direction; e is the viewing-zone interval; $D_b$ is the spacing between the grating device 20 and the display device 10, $D_e$ is the spacing between the viewing zones and the display device 10, and b is the grating-unit interval. According to FIG. 4 and FIG. 5, it is obvious that misalignment (along the y-direction) between sub-pixels exists, an inclined angle θ between the y'-direction and the y-direction (i.e. length direction of the grating unit) satisfies the following formulas:

$$\tan(\theta) \times N_{row} = dx'/dy', \ (\theta \neq 0, N_{row} \geqq 2) \quad \text{(Eq. 3)}$$

$$\underline{\text{or}}\ \theta = 0. \quad \text{(Eq. 4)}$$

where dx' and dy' are the sub-pixel intervals along the x'-direction and the y'-direction respectively; $N_{row}$ is the row number occupied by one sub-pixel period unit. θ=0 corresponds to the condition that x'-direction and the x-direction coincides. Under this condition, all sub-pixels of a same sub-pixel period unit belong to a same row. For a balance between display resolutions along different directions, θ≠0 is often employed. With desired $N_{zone}$ and the $N_{row}$ values, the value of grating-unit interval b can be determined according to above Eq. 2. Specifically, $N_{row}$=2 and $N_{zone}$=6 are taken as an example in FIG. 4. The sub-pixels $SP_{Raa}$, $SP_{Rad}$, $SP_{Rag}$, $SP_{Raj}$, $SP_{Ram}$, . . . , $SP_{Geb}$, $SP_{Gce}$, $SP_{Gch}$, $SP_{Gek}$, $SP_{Gen}$, . . . , . . . of the display device 10 constitute the sub-pixel group 1 corresponding to the view zone $VZ_1$. The sub-pixels $SP_{Gbb}$, $SP_{Gbe}$, $SP_{Gb}$h, $SP_{Gbk}$, $SP_{Gbn}$, . . . , $SP_{Bdc}$, $SP_{Bdf}$, $SP_{Bdi}$, $SP_{Bdl}$, $SP_{Bdo}$, . . . , . . . constitute the sub-pixel group 2 corresponding to the view zone $VZ_2$. And so forth, $N_{zone}$=6 sub-pixel groups will be determined. Adjacent sub-pixels along an arranging direction of the sub-pixels often correspond to different viewing zones, even though they may belong to a same pixel. For example, light from adjacent sub-pixels $SP_{Geb}$ and $SP_{Bec}$ shown in FIG. 4 are guided to different viewing zones $VZ_1$ and $VZ_3$ in FIG. 5, respectively. When the interval of the viewing-zone is designed to be small enough and light information of at least two perspective views, or one perspective view and one spliced view, or two spliced views are received by a same pupil 50 of the viewer, a monocular focusable three-dimensional display can be achieved based on multiple-views-one-eye display. FIG. 6 is a partial enlarged figure of FIG. 4, for showing the arrangement of the sub-pixels more clearly. Actually, when the value of inclined angle θ is set not satisfying above Eq. (3) or Eq. (4), a period unit of sub-pixels in a strict sense does not exist. However, the multiple-views-one-eye display is also implementable, as long as the requirement that "the arrangement of the viewing zones can guarantee that at least two perspective views, or at least one perspective view and one spliced view, or at least two spliced views will be perceived by a pupil 50 of a viewer" is satisfied.

All kinds of the existing display panels may be taken as the display device 10. In a display panel, a color image gets presented by mixing light beams of M kinds of basic colors from different sub-pixels. For example a RGB display panel with M=3, or a RGBW display panel with M=4. Here, W refers to sub-pixels emitting white light. And R, G, B, and W refer to different colors of the light from different sub-pixels, called basic colors here. As discussed above, when only minimum two passing-through light beams are overlapped for multiple-views-one-eye display, a monocular focusable displayed light spot can get implemented in a certain depth range. But the color expression of the monocular focusable displayed light spot may be inaccurate due to loss of some basic colors. For an accurate color expression, when implementing multiple-views-one-eye display based on the spatial overlapping of light beams projected from each sub-pixel, the overlapped light beams passing through each displayed point received by a same viewer's pupil is optimally at least M beams of different colors. This also requires that a same pupil 50 of the viewer receives at least M perspective views or/and spliced views optimally, and these M perspective views or/and spliced views are of M basic colors, respectively. Such as green perspective views or spliced views, white perspective views or spliced views, respectively. That is to say, all the sub-pixels projecting light information into a same pupil 50 of the viewer can optimally be combined into M sub-pixel groups or spliced sub-pixel groups, which respectively emit light of M basic colors. Under the design parameters shown in FIGS. 4 and 5, the perspective views corresponding to each view zone respectively emit light of M different basic colors, and each of their corresponding sub-pixel groups is not of a same basic color. At this time, in order to achieve an ideal color presentation effect, the optimal situation is that the sub-pixels corresponding to all perspective view(s) or partial view(s) perceived by the viewer's pupil 50 can be divided and regrouped into M=3 sliced sub-pixel groups, and these M=3 sliced sub-pixel groups emit R, G, and B lights, respectively.

Figure 8:
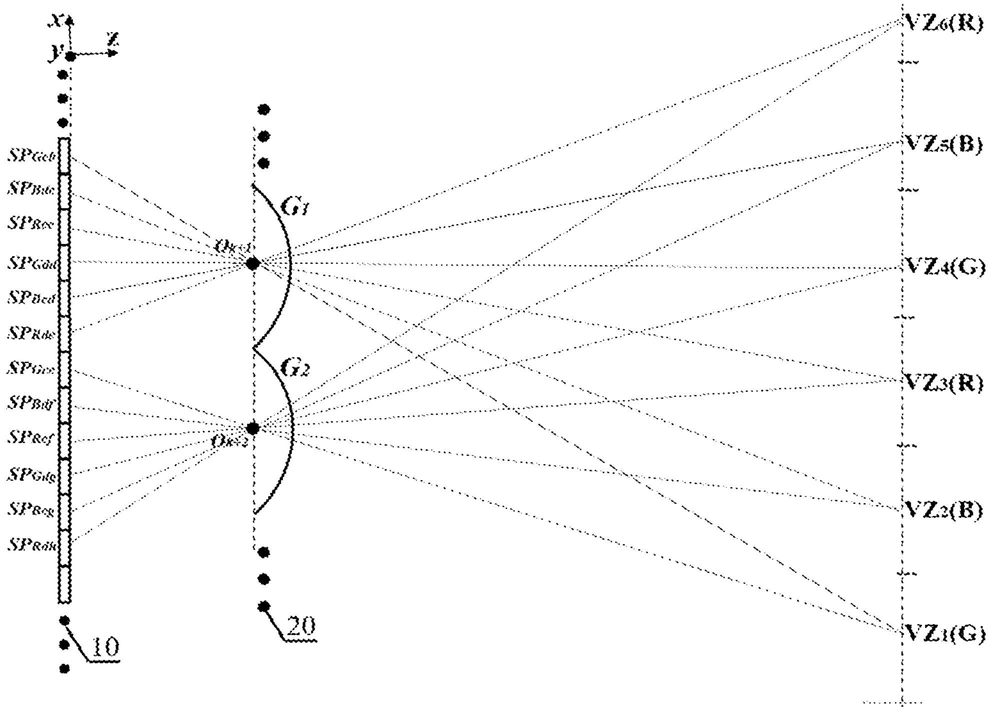
FIG. 8 a schematic view shows a perspective view of a basic color being projected through light splitting by the grating device.
Figure 9:
FIG. 9 is a partial enlarged view shows the position between a grating device and corresponding sub-pixels shown in FIG. 7.

The arrangement structure of the sub-pixels in a display device 10 can also be specially designed, so that the sub-pixels corresponding to each viewing zone are a group of sub-pixels that emit light of a same basic color. For example, sub-pixel groups corresponding to M adjacent viewing zones are designed to project light of M different basic colors respectively. For example, by using the sub-pixel arrangement shown in FIG. 7, the purpose of emitting a perspective view of a same basic color through each viewing zone can be achieved, and the M perspective view M adjacent viewing zones shows different colors, as shown in FIG. 8. This design is favourable to the ideal presentation of colors. FIG. 9 is a partially enlarged view of FIG. 7 to more clearly illustrate the arrangement of sub-pixels.

Figure 10:
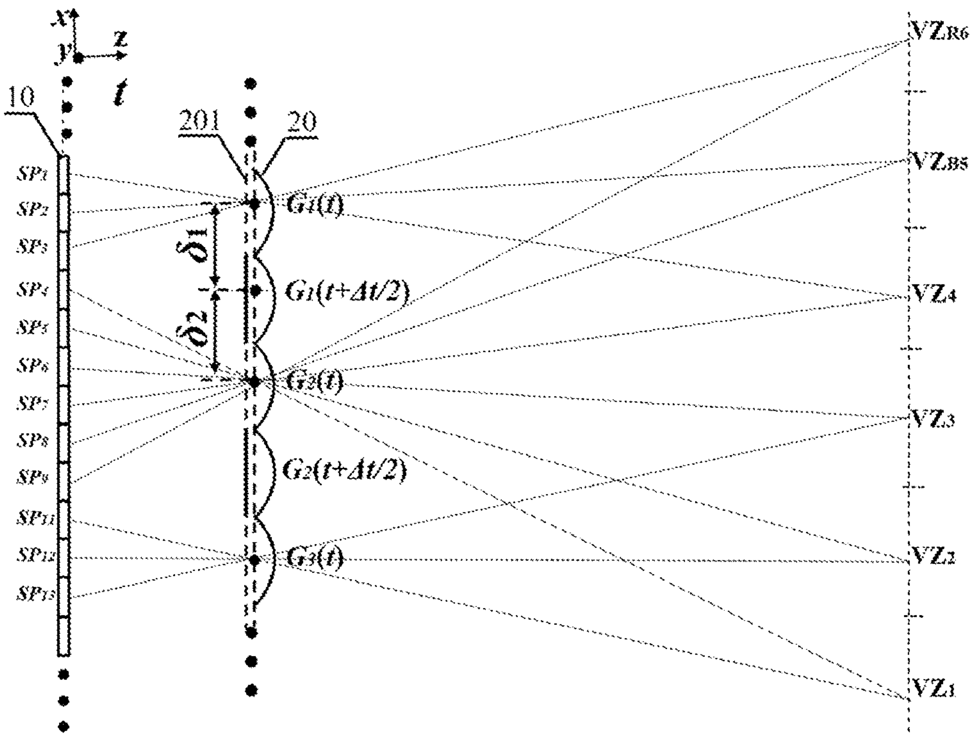
FIG. 10 is a schematic view shows a gating state of a grating device endowed with timing characteristics.
Figure 11:
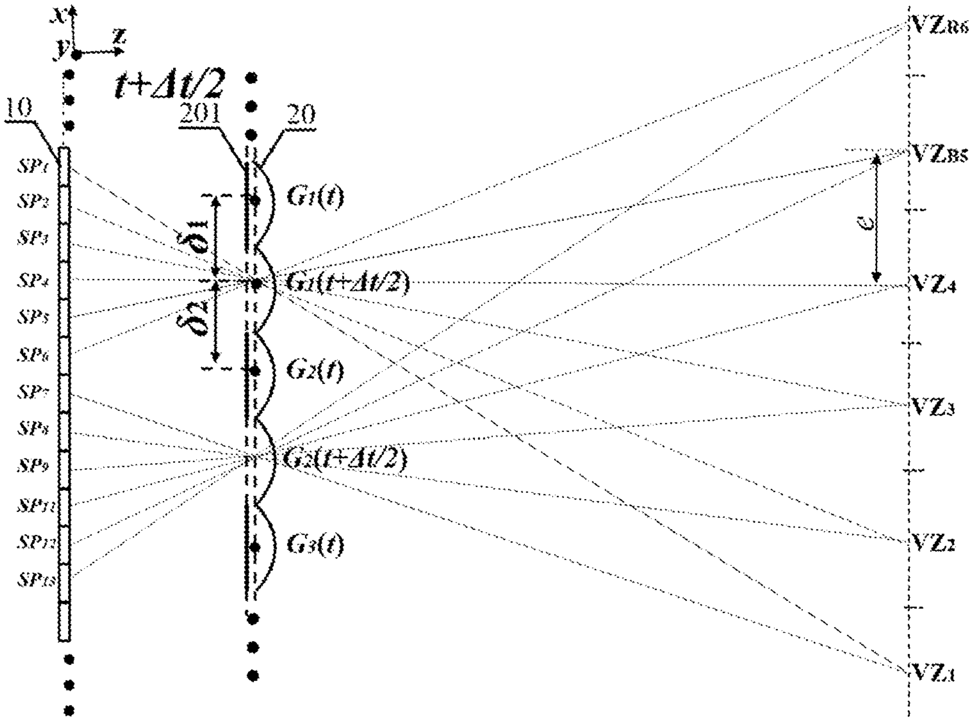
FIG. 11 is a schematic view shows another gating state of a grating device endowed with timing characteristics.

A grating device 20 can also be endowed with timing characteristics. T grating-unit groups are formed, wherein each grating-unit group are formed by grating units spaced by (T−1) grating unit(s) along the arranging direction of the grating units, and T≥2. T grating-unit groups is controlled, by the control device 30, to be allowable for light transmission at T adjacent time-points of a time-period sequentially, with only one grating-unit group being turned on for light transmission at a time-point. FIG. 10 takes T=2 as example. Grating units $G_1(t)$, $G_2(t)$, $G_3(t)$, . . . constitute a grating-unit group 1, $G_1(t+\Delta t/2)$, $G_2(t+\Delta t/2)$, $G_3(t+\Delta t/2)$, . . . constitute a grating-unit group 2. At time-point t of a time-period t~t+Δ1, each grating unit of the grating-unit group 1 is turned on for light transmission, with each grating unit of the grating-unit group 2 being turned off. At time-point t+Δt/2 of the time-period t~t+Δt, each grating unit of the grating-unit group 2 is turned on, with each grating unit of the grating-unit group 1 being turned off. The turning on or turning off of each grating unit is controlled by the control device 30. For example, as shown in FIG. 10 and FIG. 11, apertures of an aperture array 201 are placed correspondingly to the grating units of the grating device 20 in a one-to-one manner. Under this condition, lights are projected by T=2 different sub-pixel groups to a viewing zone at T=2 time points of each time period respectively, and in the case of small Δt, based on persistence of vision, it is equivalent to that resolution of the perspective view received by the viewer through this viewing zone gets improved. In FIGS. 10 and 11, along the arranging direction of the grating units, when the viewing-zone intervals $\delta_1$ and $\delta_2$ between a viewing zone and adjacent two viewing zones take an equal value, the viewing zone generated at different time points of each time period overlap spatially with each other. It can also be set that $\delta_1 \neq \delta_2$, such that the viewing zone spaces generated at different time-points of a time-period arranged in a misaligned manner, thereby improving the distribution density of the viewing zones.

Figure 12:
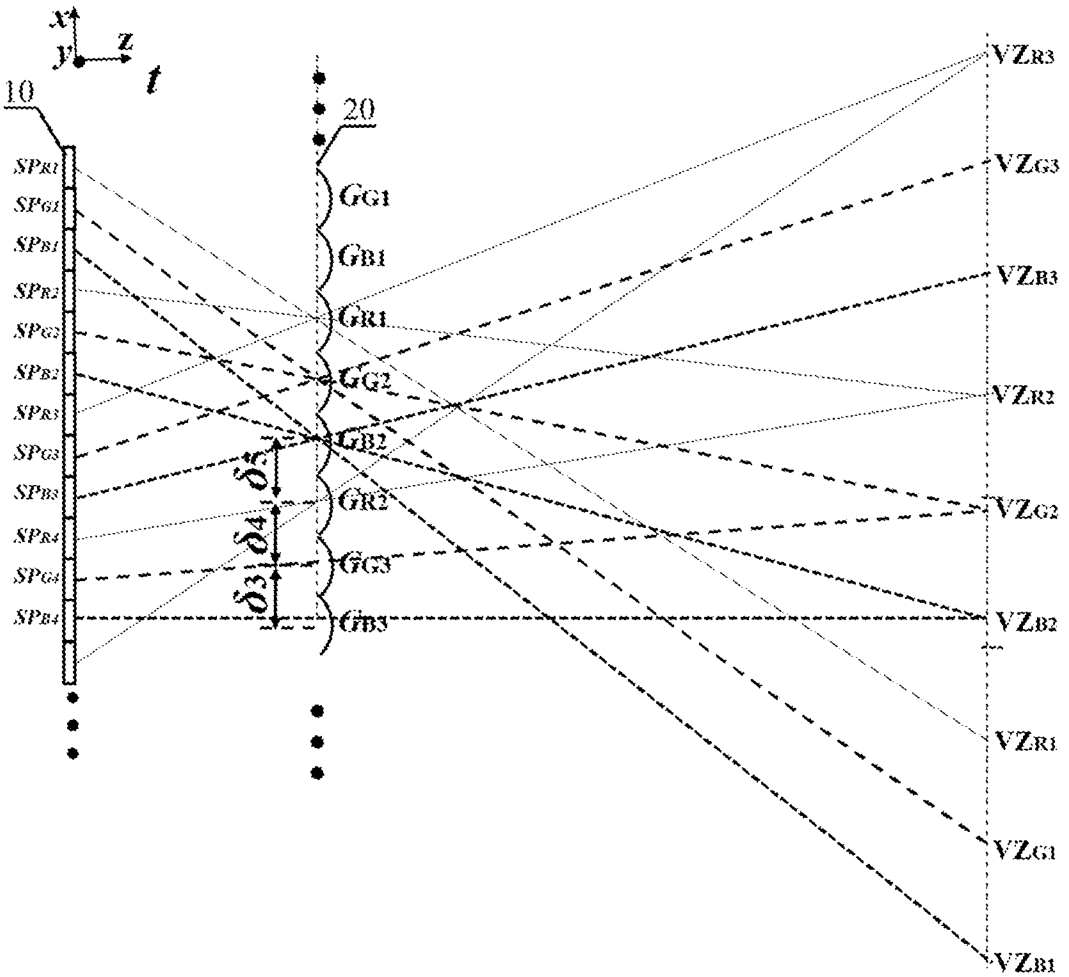
FIG. 12 is a schematic view shows the operating principle of a grating device endowed with color characteristics.
Figure 13:
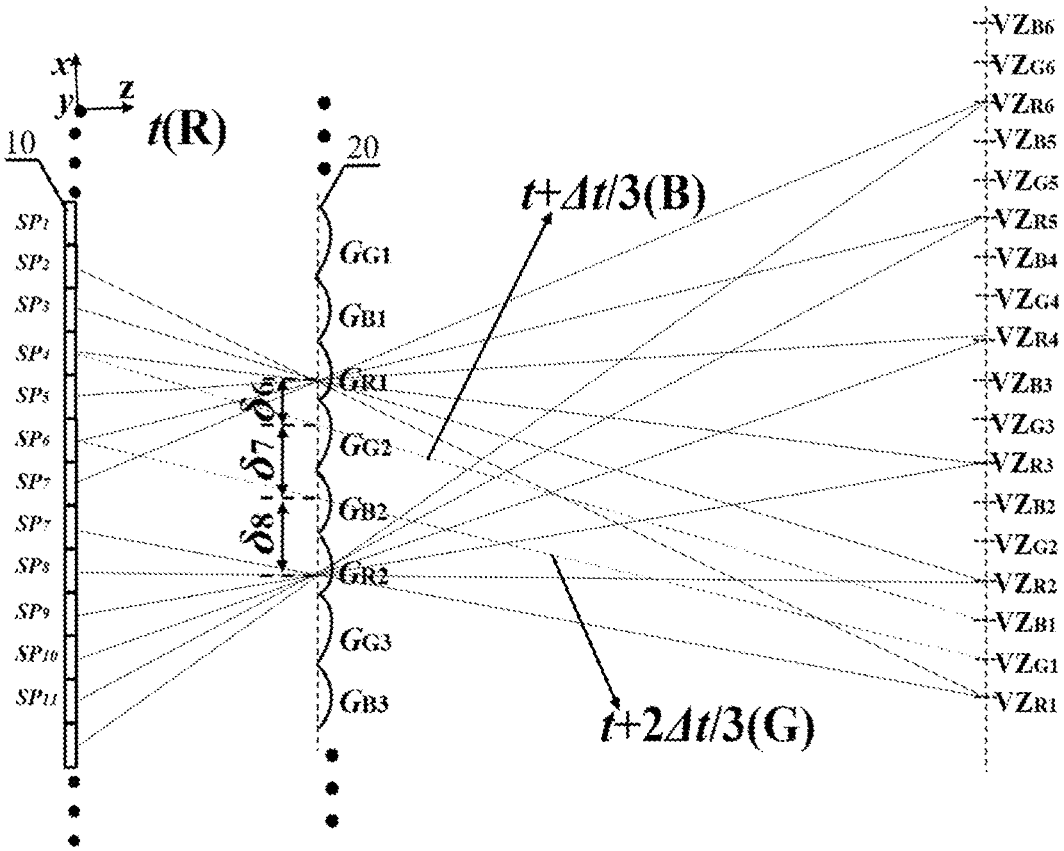
FIG. 13 is a schematic view shows another application of a grating device endowed with color characteristics.

A grating device 20 may also be endowed with color characteristics. M grating-unit groups are formed, wherein each grating-unit group are formed by grating units spaced by (M−1) grating unit(s) along the arranging direction of the grating units, and M≥2. The M grating-unit groups are arranged to be corresponded to the M basic colors by a one-to-one manner, with each grating-unit group of the M grating-unit groups only allowing light of a corresponding basic color passing through. In FIG. 12, an RGB display device (with M=3 basic colors) is used as the display device 10. Adjacent M=3 grating units of a grating device 20 are attached with an optical filter which only allow R light passing through, an optical filter which only allow G light passing through, an optical filter which only allow B light passing through, respectively. And each grating unit is named with a subscript to indicate the basic color of light being allowed to pass through by the respective attached filter. For example, a grating unit $G_{G1}$ refers to a grating unit which only allows green light passing through, wherein the subscript 1 denotes its serial number in the grating units of a same kind. A grating-unit group, consisting of grating units of the same kind, is named by the same basic color of its allowed light. For example, a G grating-unit group. So, sub-pixels emitting blue light correspond to a B grating-unit group, sub-pixels emitting green light correspond to a G grating-unit group, sub-pixels emitting red light correspond to an R grating-unit group. That is to say, the perspective views from sub-pixels emitting light of different basic colors are guided to different viewing zones without mutual influence, by corresponding grating-unit groups respectively. The intervals between adjacent viewing zones, such as $\delta_3$, $\delta_4$ and $\delta_5$ shown in FIG. 12, may be optimally designed such that lights passing through M adjacent viewing zones are of M different basic colors, respectively. Such grating device 20 with color characteristics has an advantage that it may be applied to a display device 10 in which a same sub-pixel of such display device 10 emits light of different basic colors in a time sequence. As shown in FIG. 13, a sub-pixel of display device 10 emits R, G, and B light in a time sequence, with backlights incoming in a time sequence. To such kind of display device 10, said grating device 20 of color characteristics may make the viewing zones, corresponding to the light of different basic colors time-sequentially projected by a sub-pixel at a same spatial position, to be arranged in a misaligned manner. FIG. 13 shows that all the sub-pixels emits R light at the time-point/of a time-period $t \sim t+\Delta t$, which is required for time-sequentially projecting R light, G light, and B light. B light beam from sub-pixel $SP_4$ at time-point $t+\Delta t/3$ and a G light beam from sub-pixel $SP_6$ at time-point $t+2\Delta t/3$ are also shown as dashed lines in FIG. 13, to show that the M intervals between adjacent grating units are often designed uneven for a spatial misaligned arrangement of the viewing zones corresponding to perspective views of different basic colors. The grating device 20 with color characteristics shown in FIG. 12 and FIG. 13 may be replaced by a grating device 20 with timing characteristics. Under this condition, grating-unit groups corresponding to the sub-pixels emitting light of different basic colors get turned on for light transmission at different time-points sequentially, with only one grating-unit group being turned on at a same time-point. At a same time-point, in synchronization with a corresponding grating-unit group, the sub-pixels emitting light of a corresponding basic color loads light information.

The grating device 20 of above embodiments may also be replaced, for displaying in a similar way, by a slit-array grating device 20 which consists of an array of slits.

In above embodiments, a tracking device 70 shown in FIG. 2 can also be used to be connected to control device 30 for obtaining the real-time position of the viewer's pupil(s) 50(*s*). Its function is, when the viewing zone has a strip-shape, to determine, according to the position of the viewer's pupil 50, image information loaded to each sub-pixel to be a projected light information of a scene to be displayed, along a transmission direction of a light projected by the sub-pixel and entering into a pupil 50 of the viewer.

Figure 7:
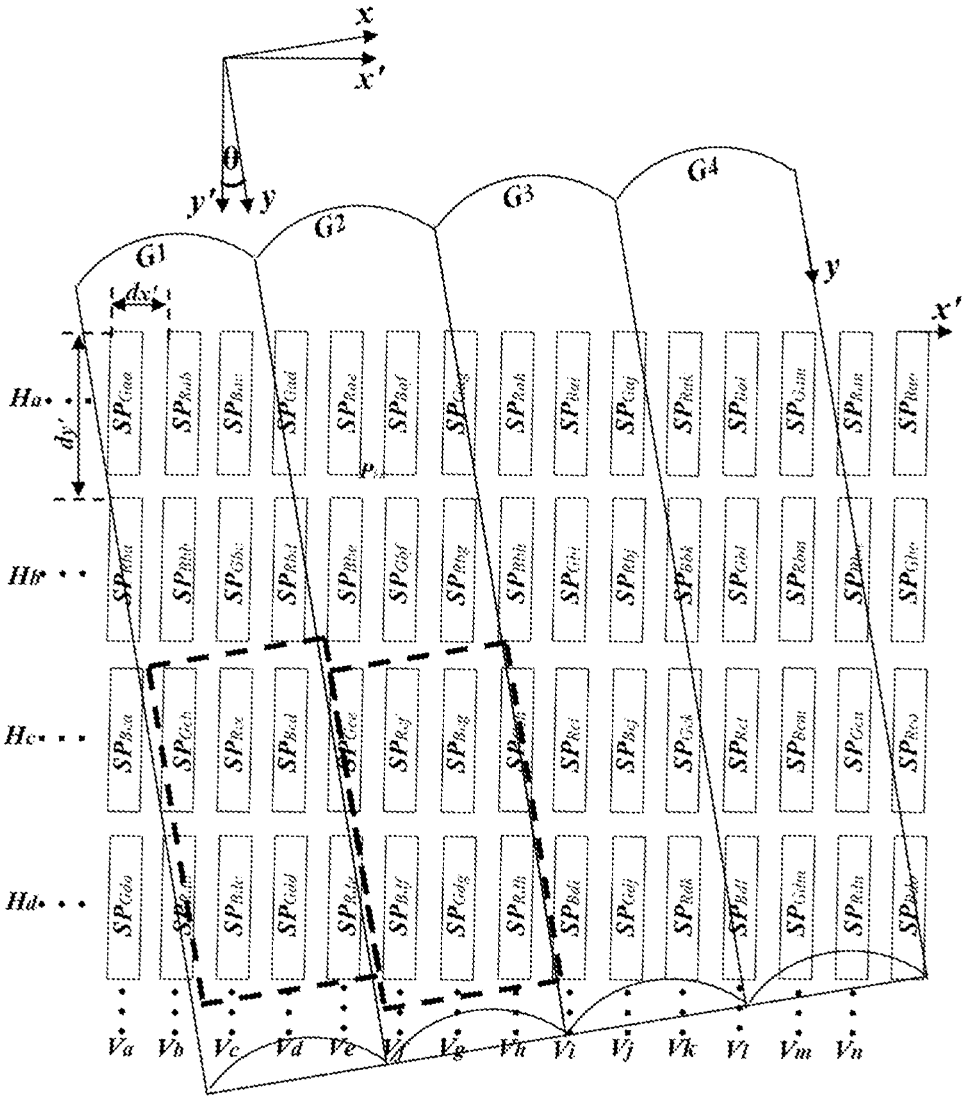
FIG. 7 is a schematic view of a sub-pixel arrangement with a projected perspective view of a basic color.

A display device with RGB pixels is exampled as a display device 10 in FIG. 4 and FIG. 7. A display device with other sub-pixel arrangements, such as a display device with a pixel consisting of R, G, B, and W sub-pixels, or a display device with pixels or sub-pixels being arranged by a Pentile arrangement, can also function as a display device 10, and based on the above principles, a multiple-views-one-eye display can be performed through a similar method. What needs to be noted is that, when some sub-pixels emitting white light is introduced, a color filter may fail to separate the white light from light of other R, G, or B colors, because the white light is a mixed light. When designing a grating device 20 with color selective characteristic, under a condition that corresponding filters are attached to each grating unit corresponding to R, G, and B light, the grating-unit group corresponding to the sub-pixel emitting white light needs to block transmission of light projected by sub-pixels emitting R light, G light, and B light by other characteristics. For example, the grating-unit group corresponding to the W light and other grating-unit groups are turned on for light transmission at different time points, and the sub-pixels corresponding to each grating-unit group only load the corresponding light information synchronously when the grating unit group is turned on for light transmission. Or, the grating-unit group corresponding to W light and other grating-unit groups allow light of different orthogonal characteristics to pass through, respectively. For example, the polarizers attached to the grating units corresponding to the W light only allow vertically polarized light passing through, and the polarizers attached to the grating units corresponding to R light, G light, and B light only allow vertically polarized light passing through, and light projected by each sub-pixel corresponding to each grating unit group is arranged to be the polarized light allowed to pass through the corresponding grating unit group. The two orthogonal polarization states here can also be replaced by circular polarization states with opposite polarization directions. In addition, besides the rectangular sub-pixels shown in the above figures, the sub-pixels can also be designed in other shapes, such as square sub-pixels, or different sub-pixels have different shapes. In addition, it is not limited to the display device 10 with thin structure, it may be other types of display device, such as a transmissive or reflective display that requires a backlight, a transmissive or reflective projection screen that receives projection information, etc.

Figure 14:
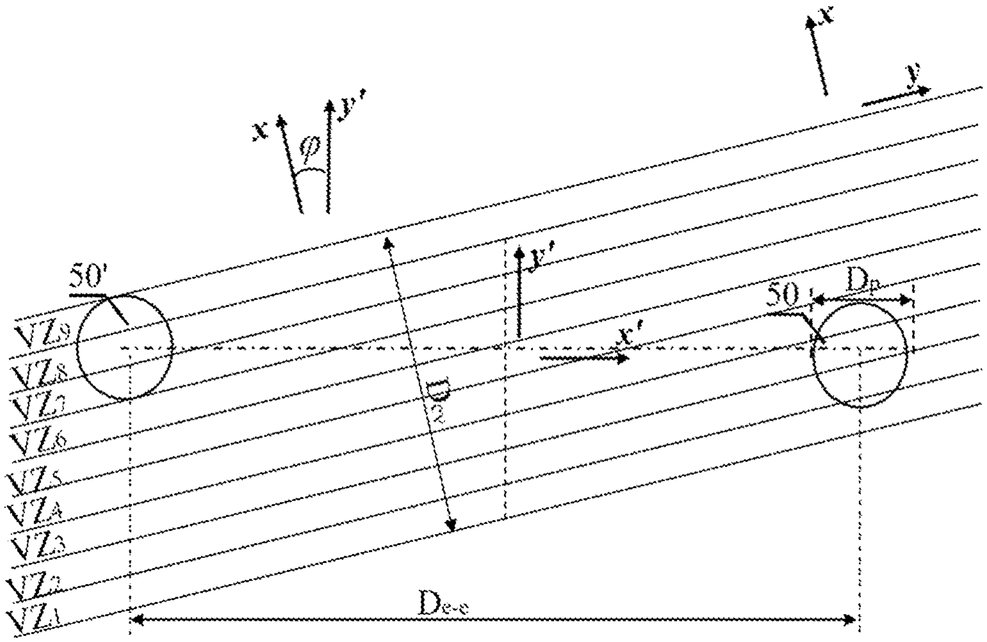
FIG. 14 is a schematic view shows how the inclination of the strip-type viewing zones influences the coverage size along direction of a line connecting two eyes.

When the number of projected viewing zones is enough such that at least two perspective views or/and spliced views are projected to each eye of the viewer, the structures shown in FIGS. 4 and 7 can be directly used as a binocular optical display engine. In this case, the coverage range along the x' direction of the line connecting both eyes of the viewer of the light information projected by all viewing zones can be increased, by designing the arrangement direction of the viewing zones to deviate from the direction of the line connecting both eyes at a larger angle. FIG. 14 takes the situation when the viewer's eyes are exactly on the distribution plane of the viewing zones as an example. Each sub-pixel group of the display device 10 respectively projects light to the viewing zones $VZ_1$, $VZ_2$, $VZ_3$, . . . through the grating device 20. The coverage size of these multiple viewing zones on the plane along the arrangement direction is denoted by $D_{cv}$. The lager the angle at which the arrangement direction of the viewing zones to deviate from the direction of the line connecting both eyes is designed to be, i.e. the smaller the angle $\varphi$ shown in FIG. 14, the lager the coverage size of the viewing zones along the x' direction will be, which is more beneficial for providing a large eye-box to the viewer along the direction of the line connecting both eyes. Even when $D_{cv}<D_{e-e}$, such design of $\varphi$ may also satisfy demand for the multiple-views-one-eye display for both eyes of the viewer at a same time.

Meanwhile, the distribution of viewing zones also requires the interval between adjacent viewing zones along the x direction to be smaller than the diameter $D_p$ of the viewer's pupil. In the figures, the x-direction is shown deviating from the x'-direction along a clockwise direction, and it may also deviates from the x'-direction along a counter-clockwise direction. In fact, when the viewer's eyes are not on the distribution plane of the viewing zones, with the above design of the angle φ, the coverage range of the viewing zones along the direction of the line connecting both eyes may also be increased. But in this case, the views received by each eye of the viewer may be sliced views. During the above process, the minimum value of the angle φ also needs to be constrained, to avoid light information from a same viewing zone reaching into both eyes of the viewer.

Above embodiments take a grating device 20 constructed by one-dimensional arranged grating units as example. It can also be expanded into the two-dimensional direction similarly. In this case, the light modulation function of the grating device 20 is the composite of that of the two above-mentioned one-dimensional grating device, with the grating units of the two one-dimensional grating devices being arranged along two directions respectively. At this time, each viewing zone whose size is smaller than the diameter of the viewer's pupil is arranged along the two-dimensional direction.

The grating device 20 can also be composed of micro-structure units, with its microstructure units being placed correspondingly to the sub-pixels in a one-to-one manner, to guides light from corresponding sub-pixel to corresponding viewing zone independently. For example, a micro grating correspondingly placed to a sub-pixel is taken as a micro-structure unit of the grating device 20. A microstructure unit can control the light from corresponding sub-pixel independently, and the viewing zones generated by light splitting of the light from the display device 10 by the grating device 20 composed of microstructural units may be arranged along the one-dimensional direction, or along the two-dimensional direction.

When the number of viewing zones projected by the display device 10 through the grating device 20 is large enough and at least two views (perspective view(s) or/and spliced view(s)) can be project to each pupil of a viewer. The optical structure which implements displaying based the multiple-views-one-eye display method with sub-pixels as display units in present patent application can work as a binocular optical engine. If the viewing zones projected by the display device 10 through the grating device 20 can burden guiding at least two views (perspective view(s) or/and spliced view(s)) to only one pupil of a viewer, the optical structure which implements displaying based the multiple-views-one-eye display method with sub-pixels as display units in present patent application can work as a monocular optical engine only, for example an eyepiece of a head-mounted virtual reality (VR) system/augmented reality (AR) system. Under this condition, a projection device 40 is often needed for projecting an image $I_{10}$ of the display device 10. The image $I_{10}$ of the display device 10 to the projection device 40 is taken as an equivalent display device. The image $I_{20}$ of the grating device 20 to the projection device 40 is taken as an equivalent grating device. The image of each sub-pixel group of the display device 10 to the projection device 40 is taken as an equivalent sub-pixel group. All equivalent sub-pixel groups merge into the equivalent display device $I_{10}$. The image of a viewing zone to the projection device 40 is regarded as an equivalent viewing zone corresponding to an equivalent sub-pixel group which corresponds to a sub-pixel group. As specially exampled by FIG. 15, after modulated by the grating device 20, six sub-pixel groups of the display device 10 provide light information through six corresponding viewing zones $VZ_1$, $VZ_2$, $VZ_3$, $VZ_4$, $VZ_5$, and $VZ_6$, respectively. After the modulating of the projection device 40, it can be equivalently taken as that the equivalent display device $I_{10}$ gets light splitting by the equivalent grating unit $I_{20}$. Then, six equivalent sub-pixel groups project perspective views through six equivalent viewing zones $I_{VZ1}$, $I_{VZ2}$, $I_{VZ3}$, $I_{NZ4}$, $I_{VZ5}$, and $I_{VZ6}$, respectively, into the region where the viewer's pupil(s) 50(*s*) is located. That is to say, replacing the above display device 10 by its image (equivalent display device) and replacing the above grating device 20 by its image (equivalent grating device), more than one perspective views can be projected into the viewer's pupil based on the same principle, for implementing multiple-views-one-eye display. For both eyes of a viewer, two corresponding eyepieces are required, as shown in FIG. 16. In FIG. 16, the shown offset distances $\sigma_l$ and $\sigma_r$ between each projection device and corresponding display device are used for setting overlap degree between images of two display devices 10 which respectively correspond to the left eye and the right eye, for example a complete overlap, or a partial overlap when $\sigma_l$=0 and $\sigma_r$=0.

Figure 15:
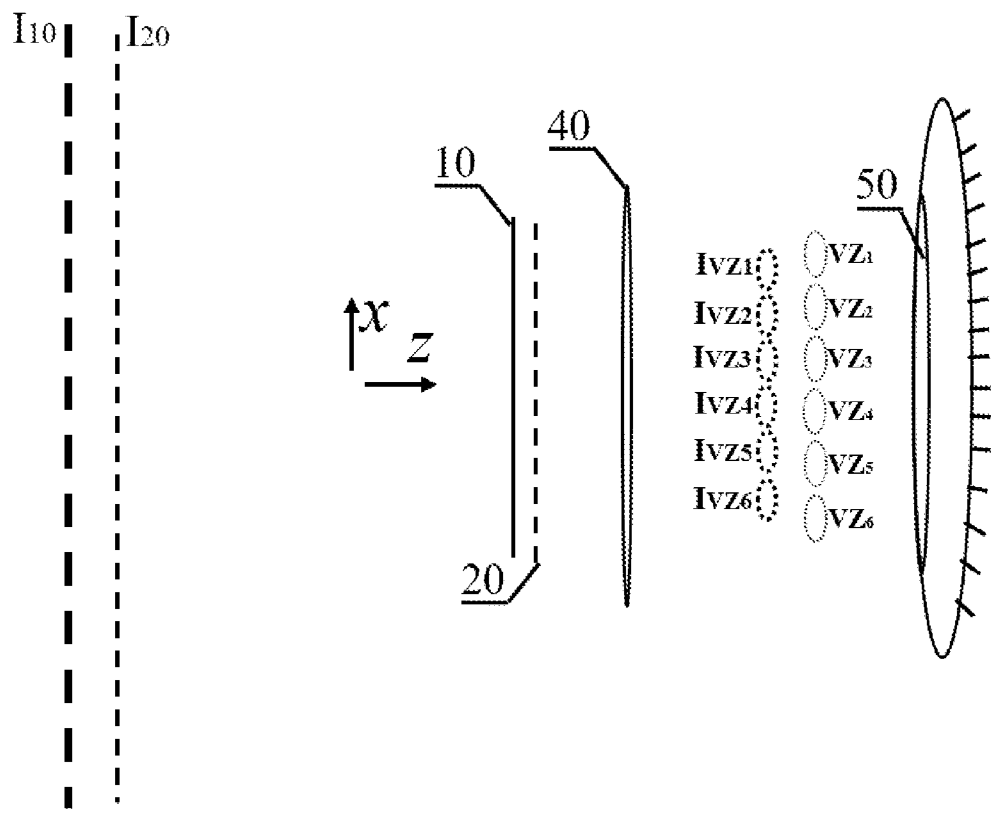
FIG. 15 is a schematic view shows a monocular optical module of a near-eye display with a projection device.
Figure 16:
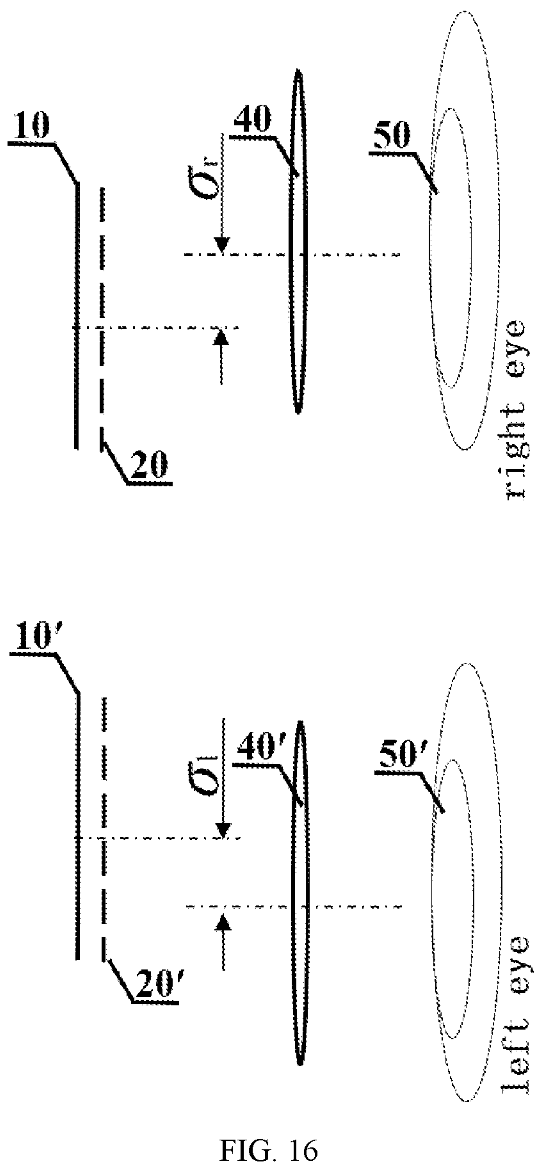
FIG. 16 is a schematic view shows a binocular structure based on monocular eyepiece.
Figure 17:
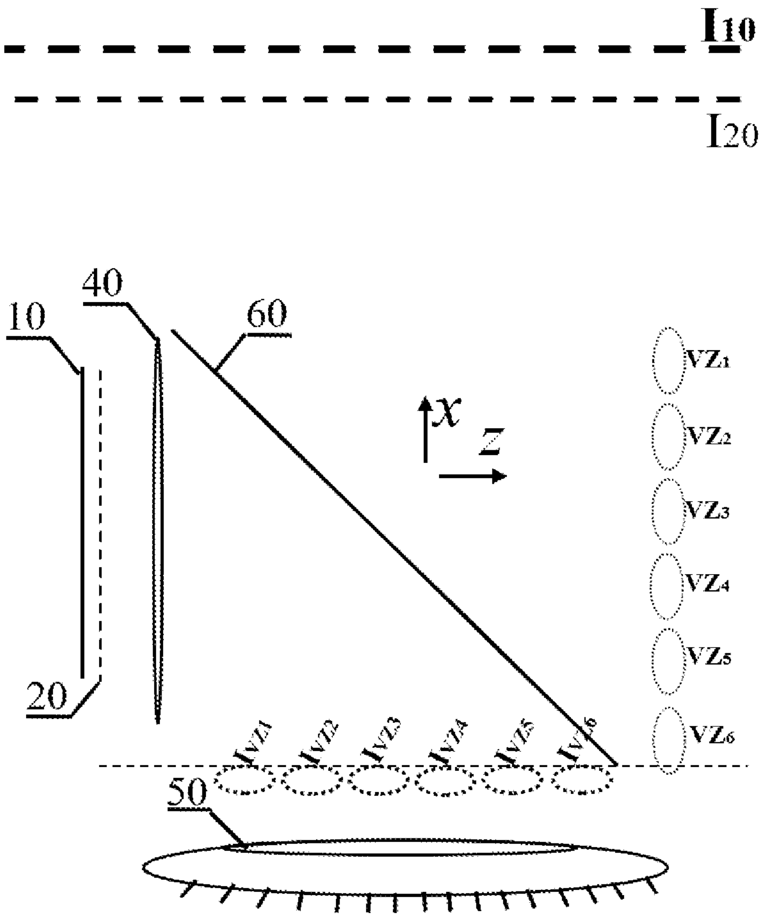
FIG. 17 is a schematic view shows a monocular eyepiece of a near-eye display with a relay device.
Figure 18:
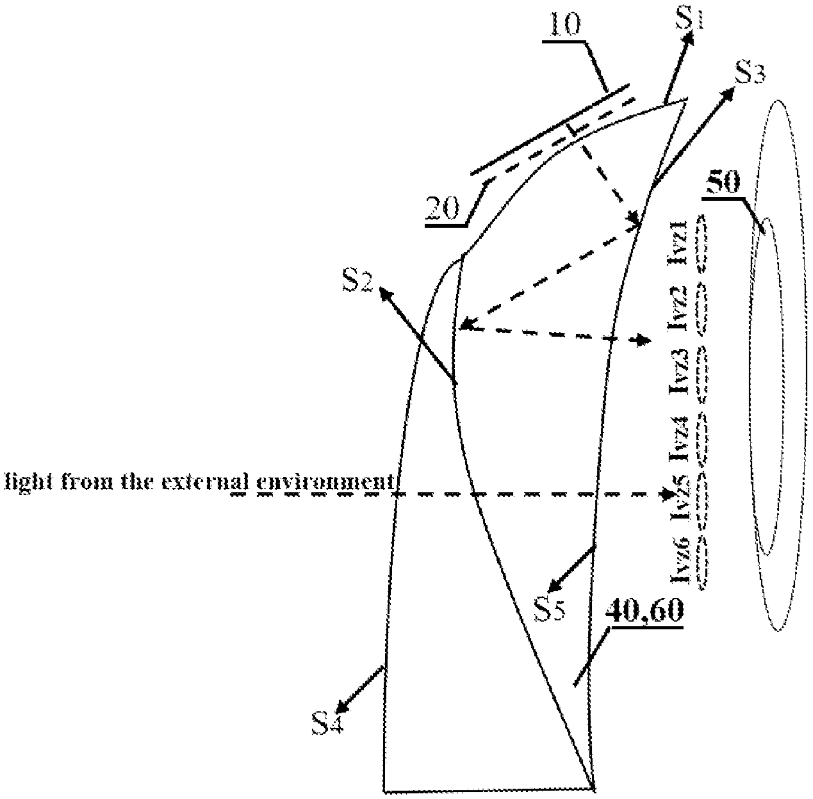
FIG. 18 is a schematic view shows a relay device consisting of free-form surfaces.

In the structure shown in FIG. 15, a relay device 60 can also be further introduced, for steering the light from the display device 10 to the region where the viewer's pupil is located, along a deflection path, as shown in FIG. 17. In FIG. 17, a semi-transparent and semi-reflective surface which allows incoming of ambient light is taken as an example of a relay device 60. Under this condition, an image $I_{10}$ of a display device 10 to the projection device 40 and the relay device 60 functions as an equivalent display device, an image $I_{20}$ of a grating device 20 to the projection device 40 and the relay device 60 functions as an equivalent grating device. The images $I_{VZ1}$、$I_{VZ2}$、$I_{VZ3}$、$I_{VZ4}$、$I_{VZ5}$、$I_{VZ6}$ of the viewing zones $VZ_1$、$VZ_2$、$VZ_3$、$VZ_4$、$VZ_5$、$VZ_6$ to the projection device 40 and the relay device 60 correspondingly function as equivalent viewing zones. The semi-transparent and semi-reflective surface in FIG. 15 can also be replaced by a reflective surface. Even a reflective concave surface can replacing the projection device 40 and the relay device 60 together. The relay device 60 can also choose other types of optical devices, even an integration of multiple optical elements (for example, an combination of free-form surfaces shown in FIG. 18). This combination of free-form surfaces include a transmissive cured surface F1, a reflective cured surface F2, a semi-transparent and semi-reflective cured surface F3, a transmissive cured surface F4, and a transmissive cured surface F5. Surfaces F1, F2, F3, and F4 together perform the functions of a projection device 40. Surfaces F2 and F3 perform the functions of a relay device 60. Surfaces F5 is designed with a compensation modulation function, allowing external ambient light reaching into the pupil 50 without influences of the surfaces F2 and F3

Figure 19:
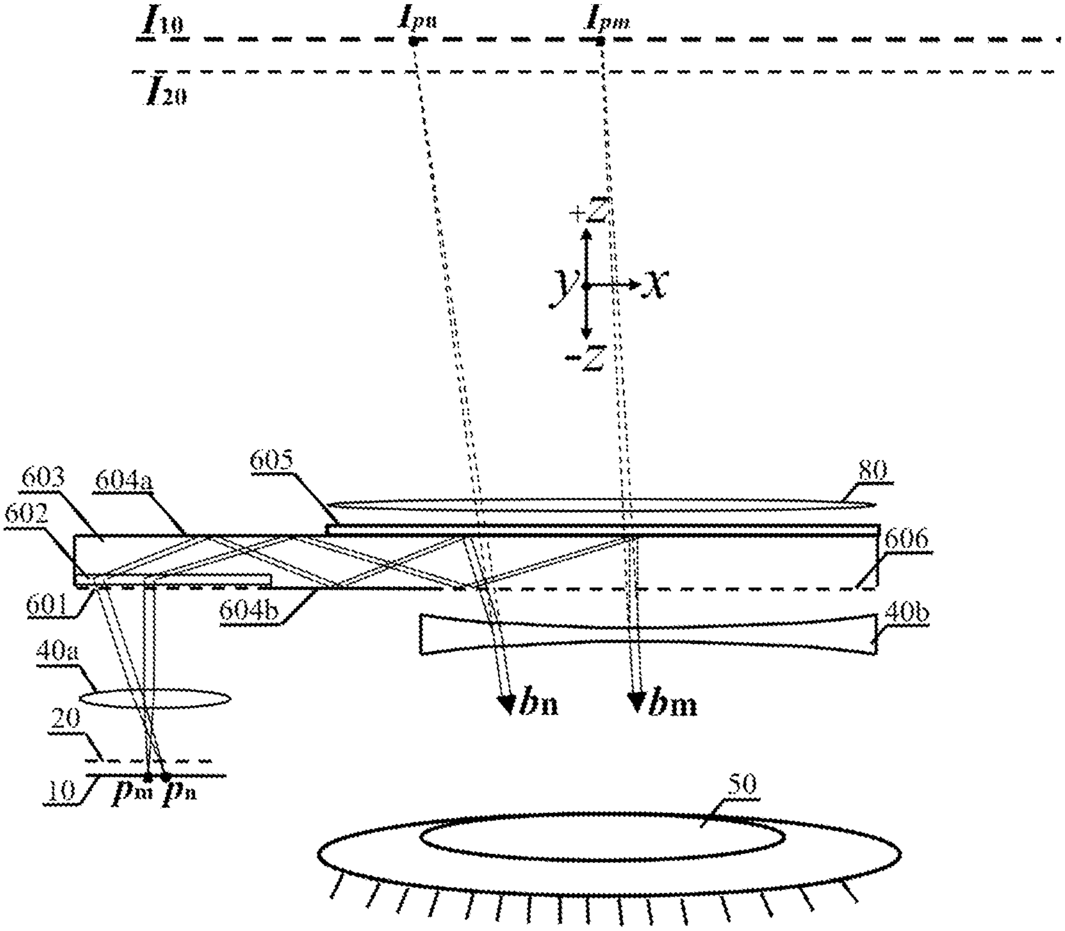
FIG. 19 is a schematic view shows a waveguide relay device.
Figure 20:
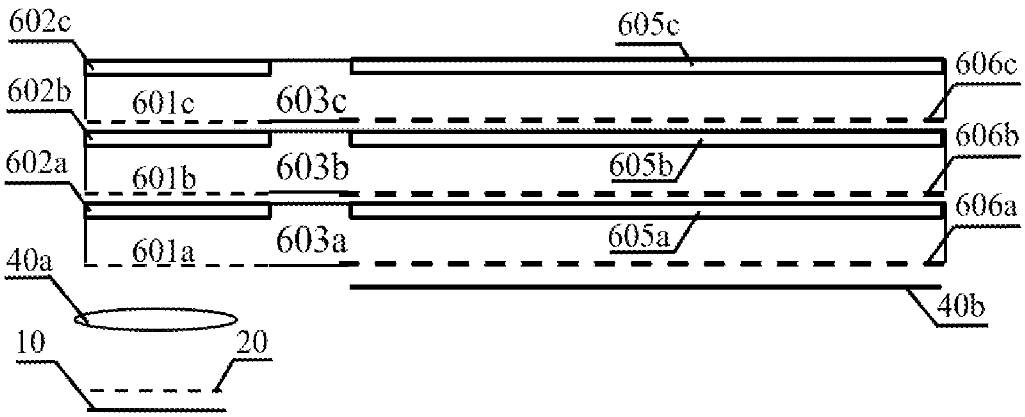
FIG. 20 is a schematic view of stacked waveguides.

A waveguide device may also be selected as the relay device 60, which is called a waveguide-type relay device 60. As shown in FIG. 19, a waveguide-type relay device 60 includes an entrance pupil 601, a coupling-in element 602, a waveguide body 603, reflective surfaces 604*a* and 604*b*, a coupling-out element 605, and an exit pupil 606. A projection device 40 includes an assembly 40*a* and an assembly 40*b*. The light from a sub-pixel (such as a sub-pixel $p_m$) in display device 10 is converted into a parallel light by the assembly 40*a* of the projection device 40. Then, the parallel light incidents onto the coupling-in element 602 through the entrance pupil 601. The coupling-in element 602 guides the parallel light from the sub-pixel $p_m$ to propagate within the wave guide body 603 to the coupling-out element 605, by the reflection of the reflective surfaces 604*a* and 604*b*. The coupling-out element 605 modulates the incident light and guides it to the assembly 40_b_ of the projection device 40 through the exit pupil 606. The assembly 40_b_ of the projection device 40 guides the light from the sub-pixel $p_m$ to propagate to the region where the pupil(s) 50(_s_) is(are) located, and converges it to a virtual image $I_{pm}$ along the reverse direction. The virtual image $I_{pm}$ is a virtual image of the sub-pixel $p_m$. Similarly, $I_{pn}$ is a virtual image of a sub-pixel $p_n$. The virtual images of the sub-pixels, such as virtual images $I_{pm}$, $I_{pn}$, and so on, build an image $I_{10}$ of the display device 10. Then, when light information from at least two views (perspective views and/or spliced views) from the equivalent display device $I_{10}$ can be received by a pupil 50, multiple-views-one-eye display gets implemented. A compensation device 80 is used to neutralize the influence of the assembly 40_b_ of the projection device 40 on the light from the external environment, which may be removed when the light from the external environment is not needed. The assembly 40_b_ shown in the figure can also be integrated into the coupling-out element 605. For example, a holographic element, or a convex reflective surface, can play the functions of a coupling-out element 605 and the assembly 40_b_ of a projection device 40 together. When the device compounding the functions of a coupling-out element 605 and the assembly 40_b_ of a projection device 40 is angle sensitive, i.e. being capable of only modulating light from the display device 10 but unresponsive to light from external environment, the compensation device 80 may also be removed. Only a common waveguide is exampled in FIG. 19. Actually, existing waveguide devices of all kinds of structures, for example, a waveguide device with a reflection surface as the coupling-in element 602, can be employed as a waveguide-type relay device 60 of present patent application. Wherein, to deal with the dispersion problem of the waveguide devices, a structure of stacked waveguides can get adopted. As shown in FIG. 20, three waveguide devices in an assembly respond for the propagating and guiding of R light, G light, and B light, respectively. Their coupling-in elements and coupling-out element are specially designed according to the wavelength of the light which is responsible by each of them, respectively, so to decrease the dispersion effect.

Figure 21:
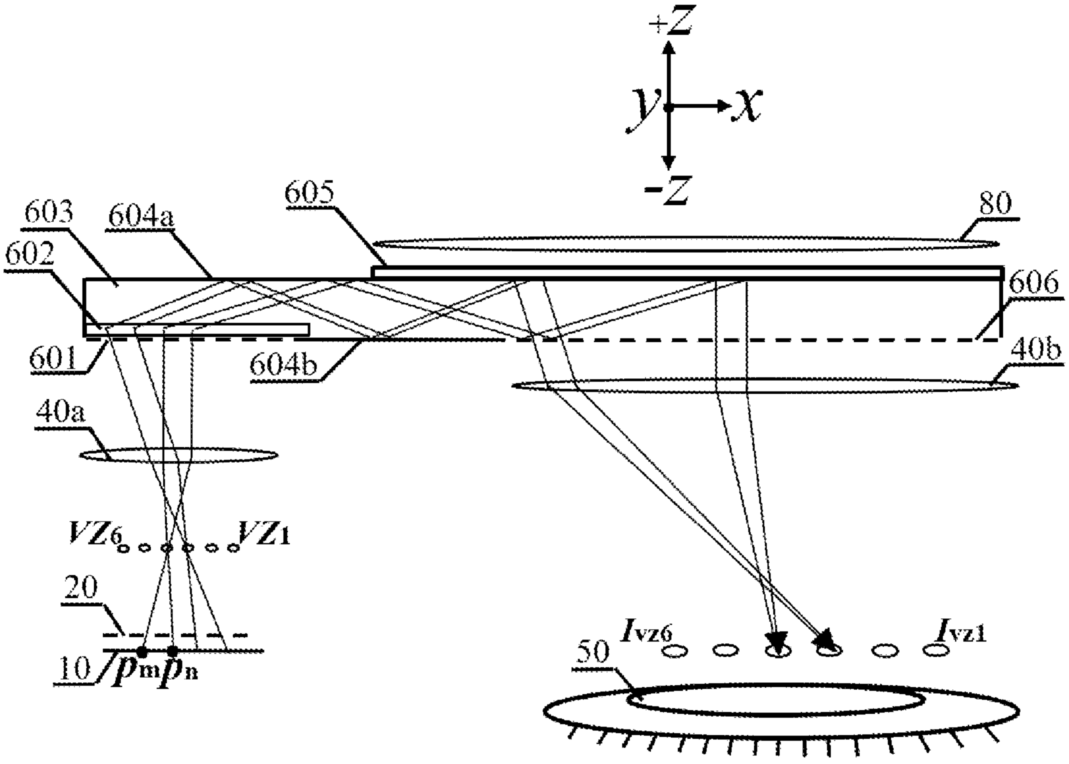
FIG. 21 is a schematic view shows another waveguide relay device.

In FIG. 19, the light from a sub-pixel, after passing through the assembly 40_a_ of the projection device 40, incidents into the waveguide-type relay device 60 as a parallel light. It can also be different situations. As shown in FIG. 21, the light emitted from the display device 10 and transmitted through each point in viewing zones generated by the grating device 20 is transformed into a parallel light by the assembly 40_a_ of the projection device 40, then incidents into the coupling-in element 602 through the entrance pupil 601 of the waveguide-type relay device 60. The coupling-in element 602 guides the parallel light from each point in viewing zones to propagate within the waveguide body 603 to the coupling-out element 605 by the reflection of the reflective surfaces 604_a_ and 604_b_. The coupling-out element 605 modulates the incident light and guides it through the exit pupil 606 to enter the assembly 40_b_ of the projection device 40. The assembly 40_b_ of the projection device 40 converges light, which is emitted from the display device 10 and transmitted through each point of a viewing zone generated by the grating device 20, to a corresponding point, thus forming an image of each viewing zone, such as the image $I_{VZ1}$ of a viewing zone $VZ_1$ in FIG. 21. Thus, through such images of different viewing zones, when light information of at least two sub-pixel group(s) or/and spliced group(s) of the display device 10 can be received by the viewer's pupil 50, a multiple-views-one-eye display will get implemented.

If the waveguide-type relay device 60 discussed above has pupil dilation function, a light beam from a sub-pixel will exit the waveguide more than one times, as different light beams. In this case, it is demanded that different light beams from a sub-pixel will not enter into the viewer's pupil 50 at a same time-point, because they carry same optical information. These different light beams from a sub-pixel should be designed with a span size larger than pupil diameter when they reach into the eye-box, guaranteeing that they cannot reach into a same pupil simultaneously. Under this condition, a tracking device 70 is necessary for determine the real-time position of the viewer's pupil 50, and the control device 30 determines the only one light beam from each sub-pixel which enters into the viewer's pupil according to this position. Then according to the direction of this light beam, determine the light information loaded to this sub-pixel based on the method discussed above.

Actually, under the premise that the light information from at least two sub-pixel groups or two spliced sub-pixel groups be received by a same pupil 50 of the viewer, the spatial positional relationship between the components shown in FIG. 19 and FIG. 20 may be adjusted, or even new components may be introduced in. Even under the condition that the light transmitted through a point of the viewing zones or light emitted by a sub-pixel enters into the waveguide-type relay device 60 with a non-parallel state, multiple-views-one-eye display can be implemented.

The core idea of the present invention is taking sub-pixels as basic display units, through light splitting of a grating device 20, guiding multiple sub-pixel groups to project at least two images into a same pupil 50 of a viewer, through the overlapping of light beams from these at least two images, forming a monocular focusable 3D scene display.

The above are merely preferred embodiments of the present invention, but the design concept of the present invention is not limited to these embodiments, and any insubstantial modification made to the present invention using this concept also falls within the protection scope of the present invention. Accordingly, all related embodiments fall within the protection scope of the present invention.

The invention claimed is:

1. A multiple-views-one-eye display method with sub-pixels as basic display units, comprising following steps of:

(i) with sub-pixels of a display device as basic display units, arranging a grating device in front of the display device along the light transmission direction, to guide light from a sub-pixel to a corresponding viewing zone;

wherein, sub-pixels corresponding to a same viewing zone constitute a sub-pixel group, and a same sub-pixel belongs to only one sub-pixel group at a same time-point;

(ii) loading data to the sub-pixels by a control device, with loaded data of a sub-pixel being the projection information of a displayed 3D scene along the light beam from the sub-pixel and reaching to corresponding viewing zone;

wherein, an image displayed by a sub-pixel group is a perspective view of the displayed 3D scene converging to corresponding viewing zone;

wherein, the viewing zones is arranged to guarantee that at least two perspective views, or at least one perspective view and one spliced view, or at least two spliced views will be perceived by a pupil of a viewer, wherein the spliced view refers to the image displayed by a spliced sub-pixel group, and the spliced sub-pixel group is spliced by different complementary parts from different sub-pixel groups, wherein a grating unit of the grating device is a cylindrical lens, or a slit.

2. The multiple-views-one-eye display method with the sub-pixels as the basic display units according to claim 1, wherein step (i) further comprises dividing the grating units into T grating-unit groups, with adjacent T grating units belonging to different grating-unit groups; and in step (ii) further comprises gating the T grating-unit groups by the control device at T time-points of a time-period sequentially, with only one grating-unit group being turned on at each time-point; wherein $T \geq 2$.

3. The multiple-views-one-eye display method with the sub-pixels as the basic display units according to claim 1, wherein in step (i) further comprises, respectively emitting light of M kinds of colors by sub-pixels of the display device, and dividing the grating units into M grating-unit groups, with adjacent M grating units belonging to different grating-unit groups, wherein $M=2$;

wherein, the M grating-unit groups correspond to the M colors in a one-to-one manner, with a grating-unit group allowing light of corresponding color passing through and blocking light of other $(M-1)$ kinds of non-corresponding colors.

4. The multiple-views-one-eye display method with the sub-pixels as the basic display units according to claim 1, wherein step (i) further comprises placing a projection device at a position corresponding to the display device, for projecting an enlarged image of the display device.

5. The multiple-views-one-eye display method with the sub-pixels as the basic display units according to claim 4, wherein step (i) further comprises placing a relay device into the light path, for guiding light from the display device to a viewer.

6. The multiple-views-one-eye display method with the sub-pixels as the basic display units according to claim 5, wherein the relay device is a reflective surface, or a semi-transparent and semi-reflective surface, or a combination of free-form surfaces, or an optical waveguide.

7. The multiple-views-one-eye display method with the sub-pixels as the basic display units according to claim 1, wherein step (ii) further comprise tracking a position of a viewer's pupils real-timely by a tracking device.

8. The multiple-views-one-eye display method with the sub-pixels as the basic display units according to claim 7, wherein step (ii) further comprises refreshing the loaded data of sub-pixels whose emitting light beams reach to a pupil according to real-time position of the pupil;

wherein, refreshed data of a sub-pixel whose emitting light beams reach to a pupil is the projection information of a displayed 3D scene along the sub-pixel's emitting light beam which reaches to the pupil.

9. The multiple-views-one-eye display method with the sub-pixels as the basic display units according to claim 7, wherein the tracking device is connected to the control device and is controlled by the control device to track a position of a viewer's pupils real-timely.

* * * * *